US007865191B2

(12) United States Patent
Nishimura et al.

(10) Patent No.: US 7,865,191 B2
(45) Date of Patent: Jan. 4, 2011

(54) WIRELESS COMMUNICATION METHOD AND WIRELESS COMMUNICATION APPARATUS

(75) Inventors: Masaki Nishimura, Saitama (JP); Shinobu Izumi, Saitama (JP); Satoru Maeda, Kanagawa (JP)

(73) Assignee: Sony Corporation (JP)

( * ) Notice: Subject to any disclaimer, the term of this patent is extended or adjusted under 35 U.S.C. 154(b) by 917 days.

(21) Appl. No.: 10/511,634

(22) PCT Filed: Apr. 22, 2003

(86) PCT No.: PCT/JP03/05107

§ 371 (c)(1),
(2), (4) Date: May 16, 2005

(87) PCT Pub. No.: WO03/092188

PCT Pub. Date: Nov. 6, 2003

(65) Prior Publication Data

US 2005/0227702 A1      Oct. 13, 2005

(30) Foreign Application Priority Data

Apr. 23, 2002    (JP) .......................... P2002-120518

(51) Int. Cl.
*H04W 72/00*    (2009.01)
(52) U.S. Cl. .................. 455/452.2; 455/450; 455/454; 455/455; 455/509; 455/513; 455/63.1; 455/67.11; 455/134; 455/150.1; 455/161.1; 455/168.1; 455/188.1; 455/550.1

(58) Field of Classification Search ................. 455/509, 455/522, 513, 103, 168.1, 62
See application file for complete search history.

(56) References Cited

U.S. PATENT DOCUMENTS 6,366,763 B1    4/2002    Ue et al.
7,342,973 B2 *  3/2008    Walker et al. ............... 375/260
2001/0046213 A1 11/2001   Sakoda

FOREIGN PATENT DOCUMENTS

JP      2000-49663 A    2/2000
JP      2001-308830 A   11/2001
JP      2001-320326 A   11/2001

* cited by examiner

*Primary Examiner*—Charles N Appiah
*Assistant Examiner*—Willie J Daniel, Jr.
(74) *Attorney, Agent, or Firm*—Lerner, David, Littenberg, Krumholz & Mentlik, LLP

(57) ABSTRACT

Wireless communication is carried out between devices. A highest frequency band is selected. When the selected frequency band includes an unused channel in which no disturbing wave is present, a maximum transmission rate at which a received field strength value exceeds a threshold value is determined. When the selected frequency band does not include an unused channel or one in which no disturbing wave is present or there is no transmission rate associated with the selected frequency band at which the received field strength value exceeds the threshold value, the next highest frequency band is successively selected and the above is repeated. When the maximum transmission rate is successfully determined, communication is initiated using the unused channel of the selected frequency band at the maximum transmission rate as a communication channel.

20 Claims, 18 Drawing Sheets

TRANSMISSION RATES AND MODULATION
SYSTEMS DEFINED IN IEEE 802.11a
STANDARD (5.2 GHz BAND)

| MODE | TRANSMISSION RATE (Mbps) | MODULATION SYSTEM |
|---|---|---|
| A1 | 6 | BPSK |
| A2 | 9 | BPSK |
| A3 | 12 | QPSK |
| A4 | 18 | QPSK |
| A5 | 24 | 16QAM |
| A6 | 36 | 16QAM |
| A7 | 48 | 64QAM |
| A8 | 54 | 64QAM |

FIG.8

TRANSMISSION RATES AND MODULATION
SYSTEMS DEFINED IN IEEE 802.11b
STANDARD (2.4 GHz BAND)

| MODE | TRANSMISSION RATE (Mbps) | MODULATION SYSTEM |
|---|---|---|
| B1 | 1 | BPSK |
| B2 | 2 | QPSK |
| B3 | 5.5 | CCK |
| B4 | 11 | CCK |

FIG.9

WIRELESS COMMUNICATION METHOD AND WIRELESS COMMUNICATION APPARATUS

CROSS-REFERENCE TO RELATED APPLICATIONS

The present application is a national stage application under 35 U.S.C. §371 of International Application No. PCT/JP03/05107, filed Apr. 22, 2003, which claims priority from Japanese Application No. P2002-120518, filed Apr. 23, 2002, the disclosures of which are incorporated by reference herein.

BACKGROUND OF THE INVENTION

1. Technical Field

The present invention relates to a wireless communication method for use with a wireless communication system constituted by a plurality of wireless communication apparatuses and to wireless communication apparatuses that composes the wireless communication system.

2. Background Art

A system constituted of a base apparatus and a display terminal has been developed. The base apparatus functions as an information source or as an access point in which or to which a television broadcast receiving tuner is built or connected and that is connected to a telephone line through a modem as one type of a wireless LAN system that is structured in a limited area of a residence, an office, or the like. The display terminal executes functions for issuing a command to the base apparatus through a wireless communication with the base apparatus that includes receiving a picture of the television from the base apparatus, receiving information from the Internet, displaying the picture and information on a display, and transmitting and receiving electronic mail through the base apparatus.

As radio frequency bands that can be used for the wireless communication system, the IEEE 802.11a standard has defined a 5.8 GHz band (in U.S. a 5.2 GHz band, these bands are generally called 5 GHz band), whereas the IEEE 802.11b standard has defined a 2.4 GHz band.

When a wireless communication system deals with both the 5.2 GHz band and the 2.4 GHz band, it can perform a communication over a radio channel (radio frequency) properly selected as a communication channel from the 5.2 GHz band and 2.4 GHz band.

However, in a communicable area of the above-described wireless communication system, another wireless communication system of the same type as the present system or of a different type, such as Bluetooth (a registered trademark), that uses the same frequency bands as the present system might coexist.

In addition, if another system coexists with the present system, a communication radio wave of the other system may become a disturbing wave that causes data streams to be broken, moving pictures streams to be stopped, and images to be disturbed with respect to the data transmission in the present system.

Also, besides those wireless communication systems that interfere with the present system, there may be, for example, microwave ovens and so forth in the vicinity of the present system. When such a device radiates a radio wave of the radio frequency band that the present system uses, the radio wave may act as a disturbing wave and adversely affect the present system.

Furthermore, when a large volume of data, such as picture data from the television and moving picture data of the Internet, are transmitted, it would be desirable to increase the data transmission rate.

However, in the 5.2 GHz band defined in the IEEE 802.11a standard, the maximum transmission rate can be increased up to at most 54 M bps (mega bits/second). In contrast, in the 2.4 GHz band defined in the IEEE 802.11b standard, the transmission rate can be increased up to at most 11 Mbps.

If the transmission rate at which a large volume of data, such as picture data and moving picture data, is transmitted is low, it might be difficult to securely and smoothly transmit the data in a real time basis.

SUMMARY OF THE INVENTION

Therefore, the present invention provides a wireless communication system that deals with a plurality of communicable frequency bands having different transmission rates to allow a large volume of data to be securely and smoothly transmitted in real time without a disturbance from another wireless communication system and so forth and without abnormalities such as the stopping of a moving picture and disturbance of a still image.

A wireless communication method of the present invention is for use with a wireless communication system for performing a communication on a radio channel as a communication channel in a frequency band selected from a plurality of communicable frequency bands having different transmission rates, the wireless communication method comprising the steps of:

detecting radio channels that are not used in the system and that are free of a disturbing wave transmitted from the outside of the system from the frequency bands in decreasing order from relatively higher transmission rates;

detecting whether or not received field strengths at transmission rates of the detected radio channels exceed a predetermined threshold value in decreasing order from the relatively higher transmission rates; and starting a communication on a channel having a transmission rate at which the received field strength reaches or exceeds the predetermined threshold value in a manner that a communicable frequency band having a relatively higher transmission rate is prioritized and that an unused channel that is free of a disturbing wave and that has a relatively higher transmission rate in one of the frequency bands is prioritized as a communication channel in accordance with the results of the first and second detecting steps.

In the wireless communication method according to the present invention of the above-described method, a frequency band communicable at a high transmission rate is preferentially selected. A communication is started on a communication channel that is free of a disturbing wave preferentially at a high transmission rate. Therefore, the wireless communication method according to the present invention is capable of securely and smoothly transmitting a large volume of data on real time basis without a disturbance of another wireless communication system and abnormalities of stop of a moving picture and a disturbance of an image.

BRIEF DESCRIPTION OF THE DRAWINGS

The foregoing aspects, features and advantages of the present invention will be further appreciated when considered with reference to the following detailed description and accompanying drawings.

FIG. 8 is a schematic diagram showing a transmission rate and modulation of the 5.2 GHz band.

FIG. 9 is a schematic diagram showing a transmission rate and modulation of the 2.4 GHz band.

DETAILED DESCRIPTION

Best Mode for Carrying Out the Invention

Next, exemplifying the case in which the present invention is applied to the wireless communication system, which is constituted by the above-described base apparatus and display terminal, an embodiment of the present invention will be described.

Figure 1:
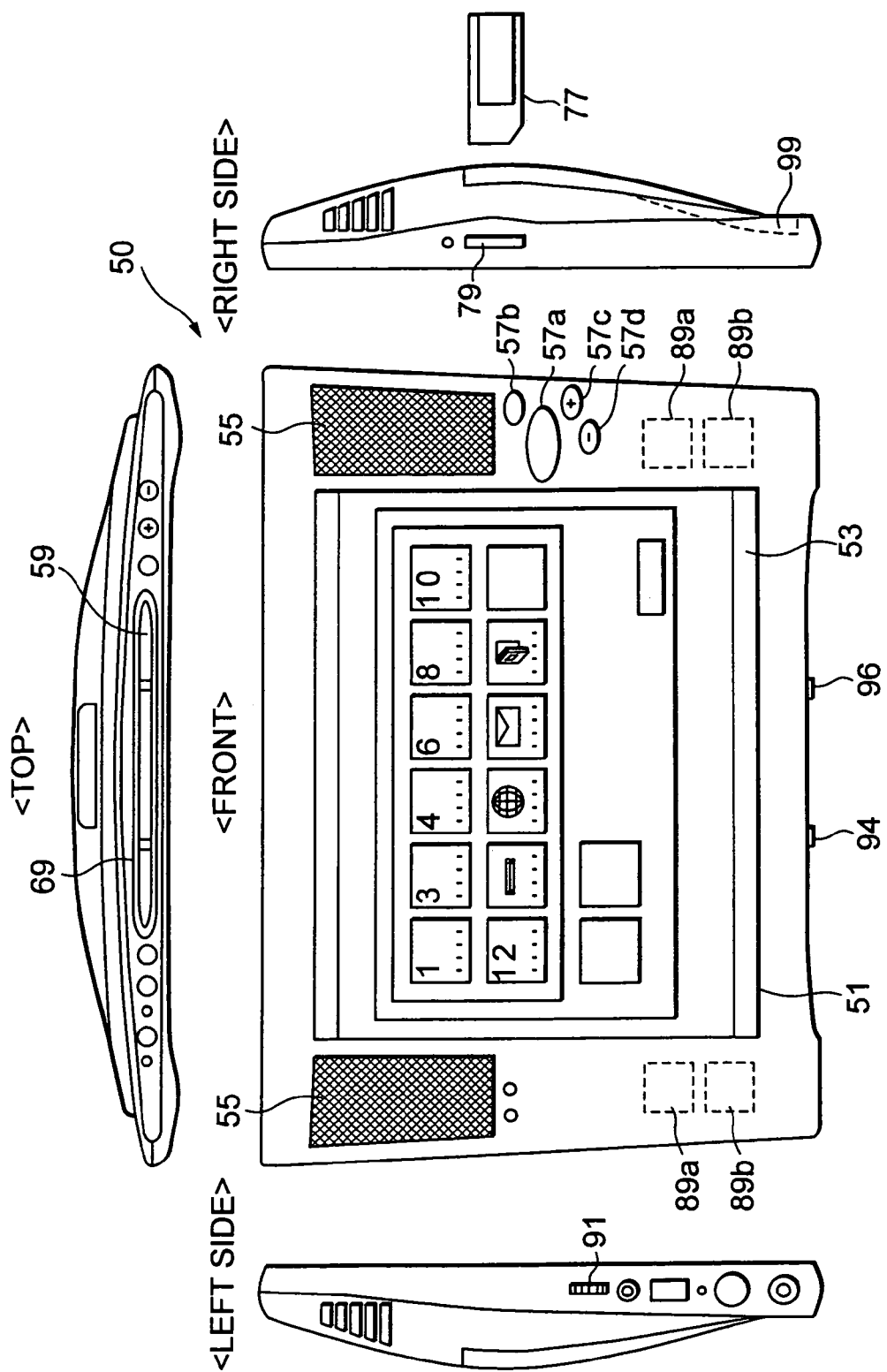
FIG. 1 is a schematic diagram showing an external structure of an example of a display terminal used as a wireless communication apparatus.
Figure 2:
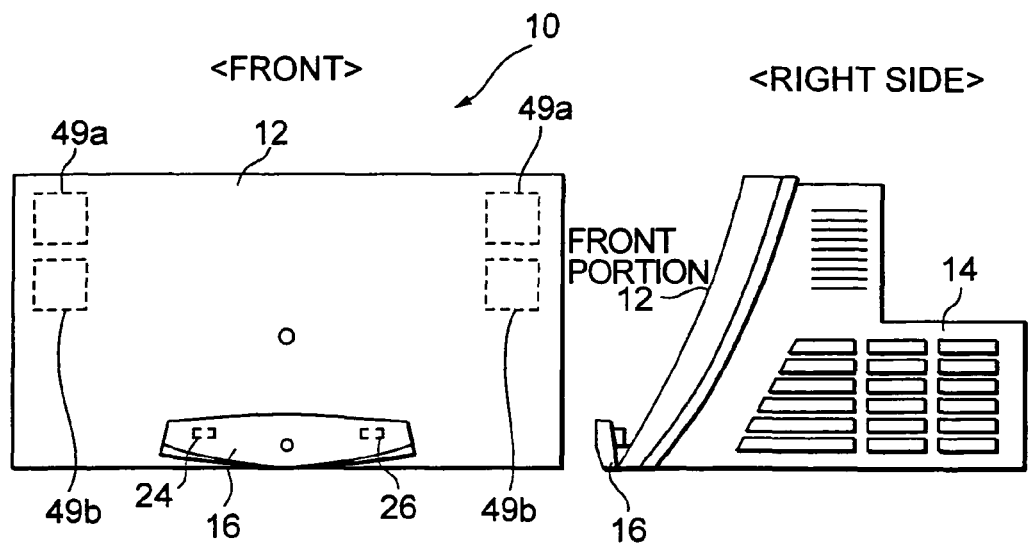
FIG. 2 is a schematic diagram showing an external structure of an example of a base apparatus used as the wireless communication apparatus.
Figure 3:
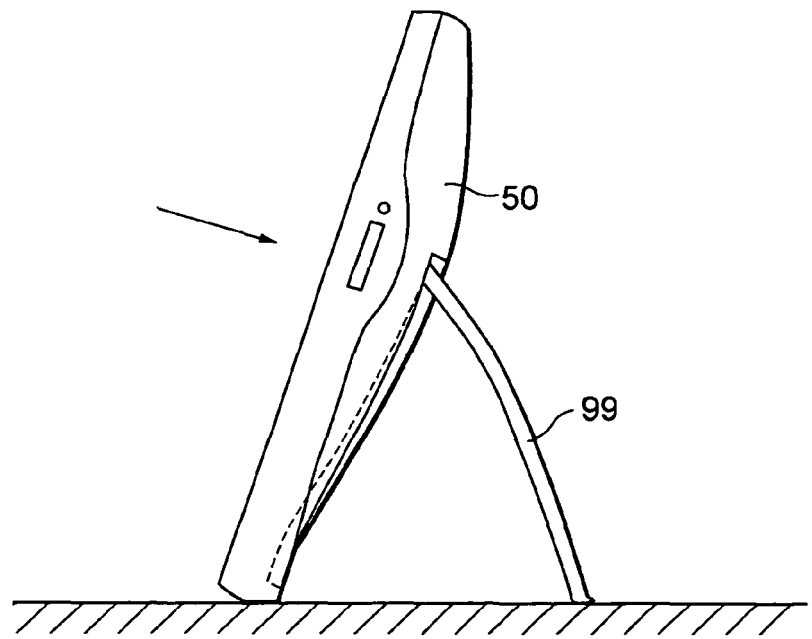
FIG. 3 is a schematic diagram showing a raised state of the display terminal.

External Structures of Display Terminal and Base Apparatus: FIG. 1 to FIG. 3:

FIG. 1 shows an external structure of an example of the display terminal, and FIG. 2 shows an external structure of an example of the base apparatus.

As shown in FIG. 1, an Liquid Crystal Display (LCD) 51 is disposed at the front of a display terminal 50. A touch panel 53 is disposed on a display screen of the LCD 51. Speakers 55 are disposed at an upper left position and an upper right position of the LCD 51. Plain antennas 89a, 89b for performing wireless communication with the base apparatus 10, which will be described later, are disposed at a lower left position and a lower right position of the LCD 51.

The antenna 89a is used for a frequency band Ba (5.2 GHz band), whereas the antenna 89b is used for a frequency band Bb (a 2.4 GHz band). The left side antenna forms a semi-spherical surface radiation pattern in the forward direction of the display terminal 50. The right side antenna forms a semi-spherical surface radiation pattern in the backward direction of the display terminal 50. One of the antennas is selected to transmit and receive a radio wave based on reception level information of the left side antenna and the right side antenna. The combination of the left side antenna and the right side antenna forms an antenna that has an all spherical surface radiation pattern. Regardless of the relation of positions of the display terminal 50 and the base apparatus 10, wireless communication between the display terminal 50 and the base apparatus 10 is securely performed.

Below the speaker 55 on the right side of the front of the display terminal 50, an index button 57a, a jump button 57b, and channel buttons 57c, 57d are disposed.

Pressing the index button 57a causes an index screen, as shown in the drawing, to be displayed on the LCD 51. By touching any item of the menu on the index screen with a touch pen or user's finger, the user can select, for example, a channel of the television, operate an external device that is connected to the base apparatus 10, access the Internet, create and transmit e-mail, and/or create and display an album.

Pressing the jump button 57b, it allows an immediately preceding television channel to be received. By pressing the channel button 57c, the current mode displayed on the LCD 51 is switched in the order from television→external device→Internet→mail→album→television. By pressing the channel button 57d, the operation screen displayed on the LCD 51 is switched in the reverse order.

An album is a picture or the like that is captured by a digital camera and recorded on a the memory card 77 and which is then displayed on the LCD 51, processed on the LCD 51, and attached to e-mail created on the LCD 51. Alternatively, an album is a picture that is stored in the display terminal 50 or in the memory card 77, a television image captured as a still picture, a picture received by e-mail, a picture obtained from the Internet, or the like.

On an upper surface of the display terminal 50, a groove portion 69 and so forth are formed. The groove portion 69 accommodates a touch pen 59. On the left side, a knob 91 and so forth are disposed. The knob 91 adjusts the brightness of the LCD 51. On the right side, a slot 79 and so forth are formed. In the slot 79, the memory card 77 is attached. At the bottom, charging terminals 94, 96 are disposed.

At a the back surface of the display terminal 50, a U-shaped stand 99 that allows the display terminal 50 to be raised is extensively and contractively disposed. A battery accommodating portion (not shown) is disposed at a portion surrounded by the stand 99. A battery is accommodated in the battery accommodating portion.

As shown in FIG. 2, the base apparatus 10 is constituted of a front portion 12 and a rear portion 14 that are integrally connected. At left and right positions of the front portion 12, plain antennas 49a, 49b for performing wireless communication with the display terminal 50 are disposed.

Like the antennas 89a, 89b of the display terminal 50, the antenna 49a is used for the frequency band Ba (5.2 GHz band) whereas the antenna 49b is used for the frequency band Bb (2.4 GHz band). The left side antenna forms a semi-spherical surface radiation pattern in the forward direction of the base apparatus 10. The right side antenna forms a semi-spherical surface radiation pattern in the backward direction of the base apparatus 10. In accordance with reception level information of the left side antenna and the right side antenna, one of the antennas is selected to transmit and receive a radio wave. The combination of the right side antenna and left side antenna forms an antenna that has a half-spherical surface radiation pattern. Regardless of the relation of the positions of the base apparatus 10 and the display terminal 50, wireless communication can be securely performed between the base apparatus 10 and the display terminal 50.

The front portion 12 is slanted backwards and, in a lower center portion thereof, a supporting member 16 is disposed that causes the display terminal 50 to be inclined against the base apparatus 10. Charging terminals 24, 26 are disposed in the supporting member 16. In addition, at a lower portion on the rear surface of the rear portion 14, various types of terminals, such as an antenna terminal and a line terminal that will be described later, are disposed.

With respect to the above-described base apparatus 10 and display terminal 50, the user can place the base apparatus 10 at a fixed position and carry the display terminal 50 to any place inside a communicable area. The user can execute functions for receiving a television broadcast, accessing the Internet, and transmitting and receiving electronic mail with the display terminal 50 that the user is holding at any place.

The user can operate the display terminal 50 by hand or, alternatively, with the stand 99 extended, as shown in FIG. 3, so that the display terminal 50 can be raised on a proper surface at a properly inclined angle.

In addition, the display terminal 50 may be inclined against the front portion 12 of the base apparatus 10. In this case, the charging terminals 94, 96 of the display terminal 50 are brought into contact with the charging terminals 24, 26 of the base apparatus 10 and are connected. As a result, the battery accommodated in the display terminal 50 can be charged by the base apparatus 10.

Figure 4:
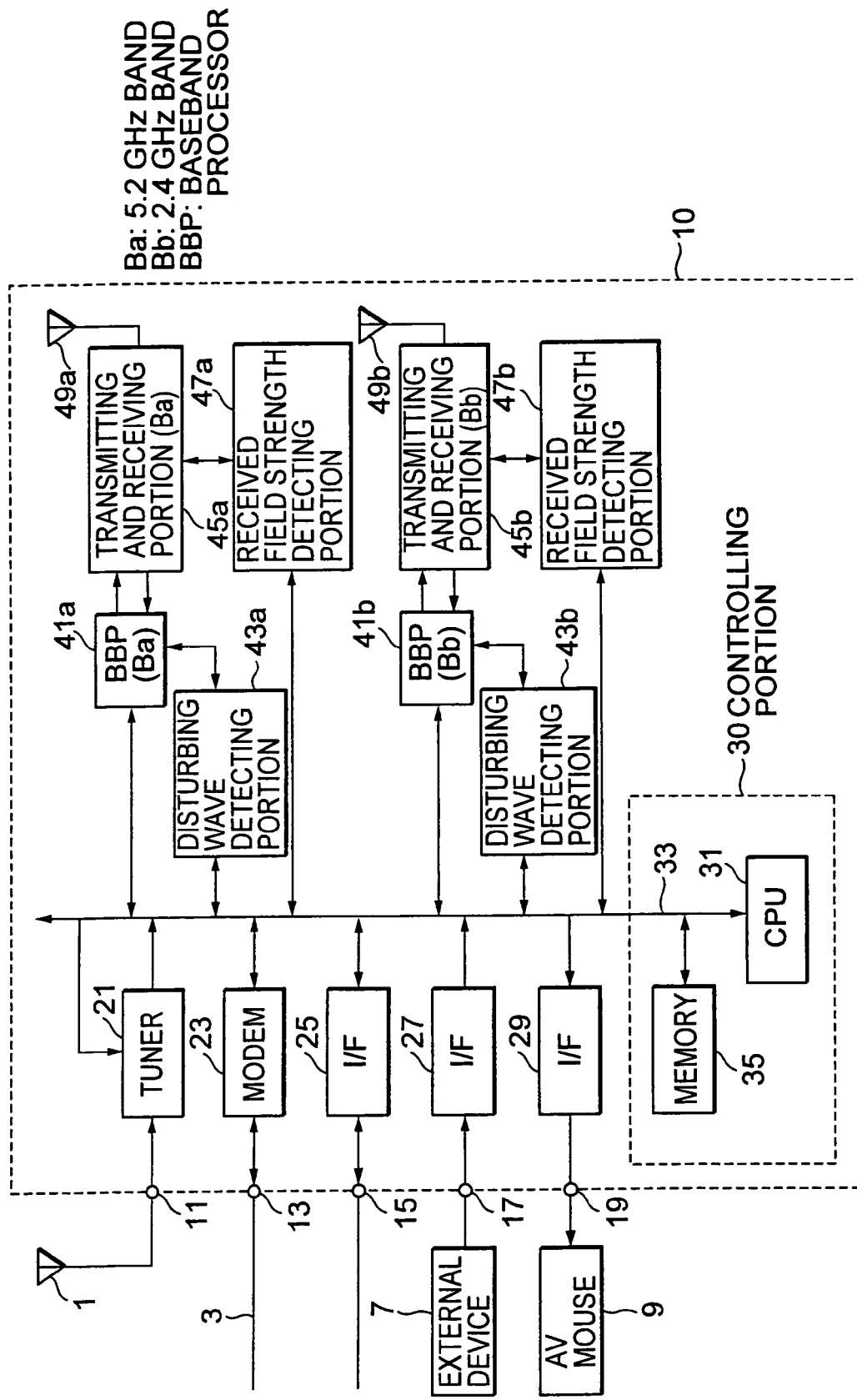
FIG. 4 is a functional block diagram of the example of the structure of the base apparatus as the wireless communication apparatus shown in FIG. 2.
Figure 5:
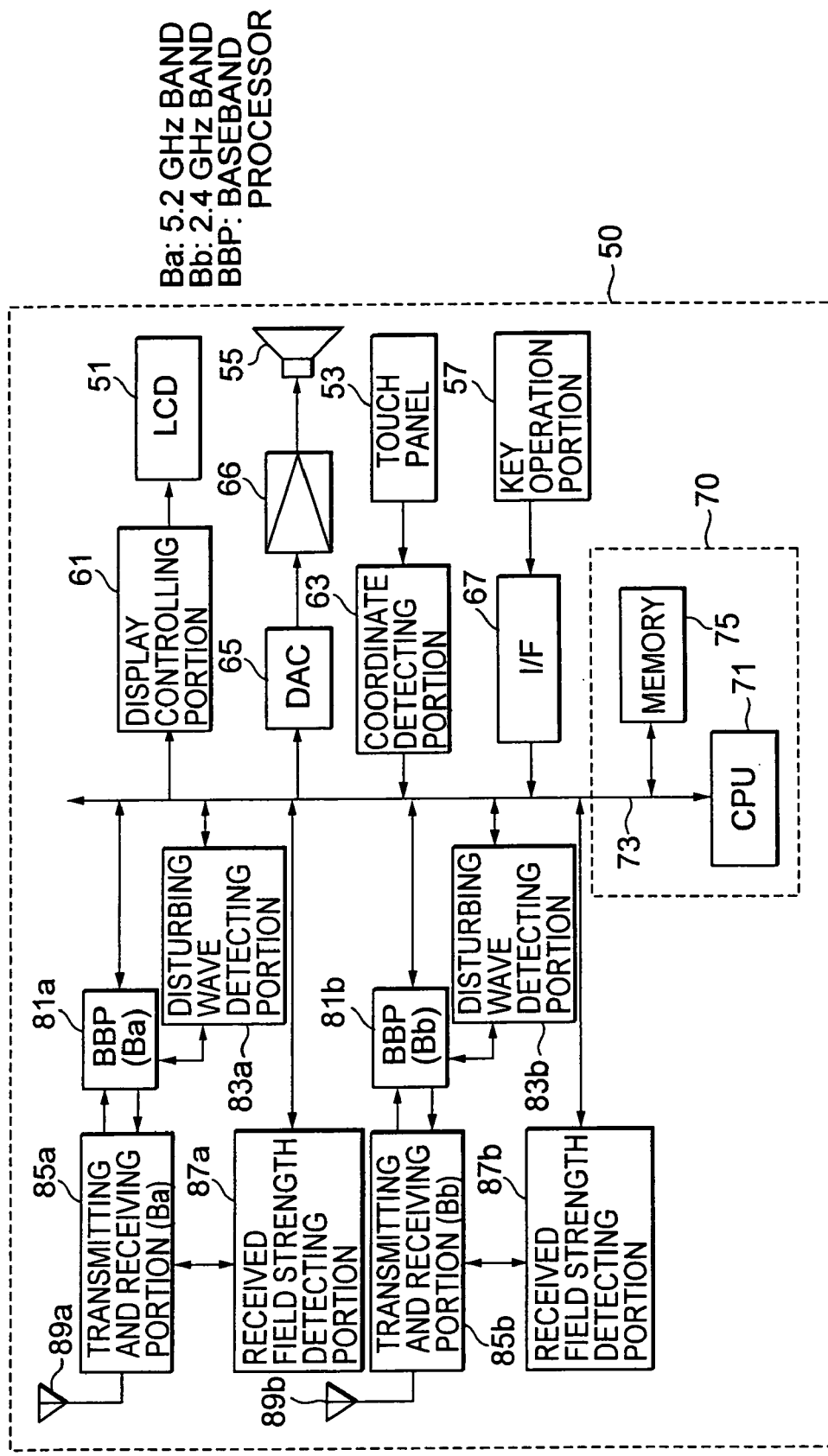
FIG. 5 is a functional block diagram of the example of the structure of the display terminal as the wireless communication apparatus shown in FIG. 1.

Functional Blocks of Structures of Base Apparatus and Display Terminal: FIG. 4 and FIG. 5:

FIG. 4 shows the functional blocks of an example of a structure of the base apparatus 10. A controlling portion 30 comprises a CPU 31. The CPU 31 is connected to a bus 33. A program executed by the CPU 31, fixed data, and so forth are written to a memory 35 in advance. The memory 35 also functions as a work area and so forth of the CPU 31. The memory 35 is connected to the bus 33.

An antenna 1 for receiving a television broadcast is connected to an antenna terminal 11. A television broadcast signal is received by the antenna 1 is channel-selected and demodulated by a tuner 21. The channel-selected and demodulated signal is then compressed and further converted into video data and audio data. The video data and audio data are then sent to the bus 33.

A telephone line 3 is connected to a line terminal 13. The line terminal 13 is connected to the bus 33 through a modem 23.

In addition, an Ethernet (registered trademark) terminal 15, for connecting an ADSL modem, a CATV modem, or the like, is connected to the bus 33 through an interface 25.

A DVD player, a hard disk recorder, a digital CS tuner, or the like is connected as external device 7 to a terminal 17. Video data and audio data from the external device 7 are sent to the bus 33 through an interface 27.

In addition, an AV mouse 9 is connected to a terminal 19. The terminal 19 is connected to the bus 33 through an interface 29. An infrared ray remote control signal is emitted by a light emitting portion of the AV mouse 9, in accordance with a command signal that is outputted from the controlling portion 30, and is received by a light detecting portion disposed in the external device 7. As a result, using the infrared ray remote control signal, the external device 7 is operated.

Base Band Processors (BBP) 41a, 41b for the frequency bands Ba, Bb are connected, respectively, to the bus 33. Transmitting and receiving portions 45a, 45b for the frequency bands Ba, Bb are connected to the BBPs 41a, 41b, respectively. The above-described antennas 49a, 49b are connected to the transmitting and receiving portions 45a, 45b, respectively.

Also, disturbing wave detecting portions 43a, 43b are connected between the BBPs 41a, 41b and the bus 33, respectively. Received field strength detecting portions 47a, 47b are connected between the transmitting and receiving portions 45a, 45b and the bus 33, respectively. The disturbing wave detecting portions 43a, 43b detect whether or not a disturbing wave exists on a radio channel selected from the frequency bands Ba, Bb, respectively, by a method that will be described later. The received field strength detecting portions 47a, 47b detect the received field strengths of the signals received by the transmitting and receiving portions 45a, 45b in accordance with control levels of an Automatic Gain Control (AGC) against the signals received by the transmitting and receiving portions 45a, 45b, respectively.

A signal transmitted from the base apparatus 10 to the display terminal 50 is processed for a baseband by the BBPs 41a, 41b and is then modulated by the transmitting and receiving portions 45a, 45b, respectively. The modulated signal is next converted into a signal of a radio channel selected from the frequency bands Ba, Bb. Thereafter, the radio channel signal is transmitted from the transmitting and receiving portions 45a, 45b to the display terminal 50 through the antennas 49a, 49b, respectively.

In addition, a signal of a radio channel selected from the frequency bands Ba and Bb and transmitted from the display terminal 50 to base apparatus 10 is received by the transmitting and receiving portions 45a, 45b through the antennas 49a, 49b, respectively. The received signal is frequency converted by the transmitting and receiving portions 45a, 45b, respectively. Thereafter, the frequency converted signal is processed for a baseband by the BBPs 41a, 41b and then received by the bus 33.

FIG. 5 shows functional blocks of an example of a structure of the display terminal 50. A controlling portion 70 comprises a CPU 71. The CPU 71 is connected to a bus 73.

A program executed by the CPU 71, fixed data, and so forth are written to a memory 75 in advance. The memory 75 also functions as a work area and so forth of the CPU 71. The memory 75 is connected to the bus 73.

The LCD 51 is connected to the bus 73 through a display controlling portion 61. A speaker 55 is connected to the bus 73 through a D/A converter (DAC) 65 and an audio amplifying circuit 66. In addition, the touch panel 53 is connected to the bus 73 through a coordinate detecting portion 63. Moreover, a key operation portion 57 including the index button 57a shown in FIG. 1, is connected to the bus 73 through an interface 67.

When the memory card 77 is attached to the slot 79, shown in FIG. 1, the memory card 77 is connected to the bus 73.

In addition, BBPs 81a, 81b for the frequency bands Ba, Bb, respectively, are connected to the bus 73. Transmitting and receiving portions 85a, 85b for the frequency bands Ba, Bb are connected to the BBPs 81a, 81b, respectively. The above-described antennas 89a, 89b are connected to the transmitting and receiving portions 85a, 85b, respectively.

In addition, disturbing wave detecting portions 83a, 83b are connected between the BBPs 81a, 81b and the bus 73, respectively. Received field strength detecting portions 87a, 87b are connected between the transmitting and receiving portions 85a, 85b and the bus 73, respectively. The disturbing wave detecting portions 83a, 83b detect whether a disturbing wave is present in a radio channel selected from the frequency bands Ba, Bb, respectively, by a method that will be described later. The received field strength detecting portions 87a, 87b detect the received field strengths of signals received by the transmitting and receiving portions 85a, 85b in accordance with control levels of the AGC against signals received by the transmitting and receiving portions 85a, 85b, respectively.

A signal transmitted from the display terminal 50 to base apparatus 10 is processed for a baseband by the BBPs 81a, 81b and is then modulated by the transmitting and receiving portions 85a, 85b, respectively. Thereafter, the modulated signal is converted into a signal of a radio channel selected from the frequency bands Ba, Bb. The signal of the radio channel is then transmitted from the transmitting and receiving portions 85a, 85b to the base apparatus 10 through the antennas 89a, 89b, respectively.

In addition, a signal of a radio channel selected from the frequency bands Ba and Bb is transmitted from the base apparatus 10 to the display terminal 50. The signal is received by the transmitting and receiving portions 85a, 85b through the antennas 89a, 89b, respectively. The received signal is frequency converted and demodulated by the transmitting and receiving portions 85a, 85b, respectively. Thereafter, the demodulated signal is processed for a baseband by the BBPs 81a, 81b and is then received by the bus 73.

Radio Frequency Bands, Radio Channels, and Transmission Rates: FIG. 6 to FIG. 9:

The above-described wireless communication system uses the 2.4 GHz band and the 5.2 GHz band, as defined in the IEEE 802.11a standard and the IEEE 802.11b, standard as the frequency bands Ba and Bb, respectively.

Figure 6:
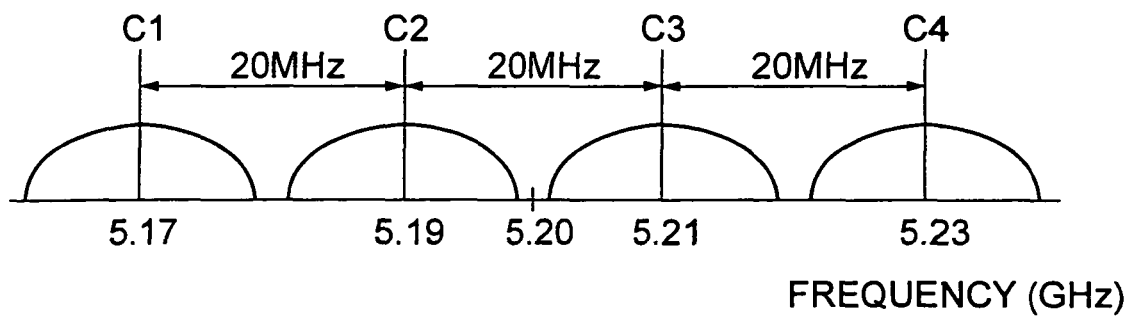
FIG. 6 is a schematic diagram showing a channel structure of a 5.2 GHz band.
Figure 7:
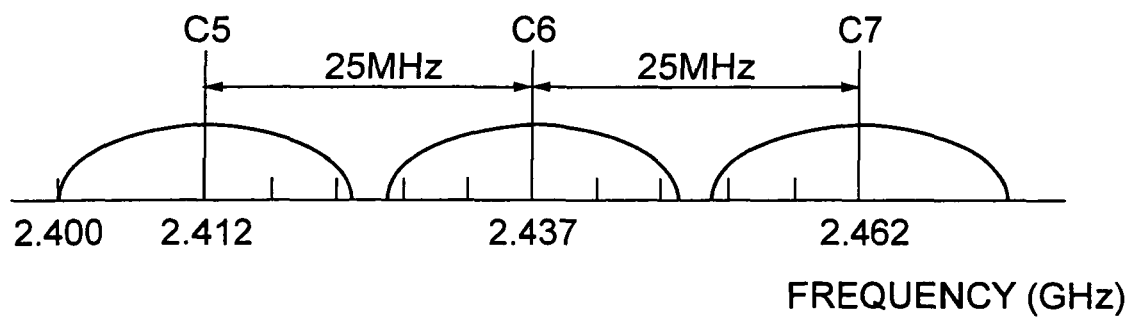
FIG. 7 is a schematic diagram showing a channel structure of a 2.4 GHz band.

It has been determined that when a plurality of radio channels are set in the 5.2 GHz band and 2.4 GHz at the same time and in the same area, as shown in FIG. 6 and FIG. 7, the frequency intervals between adjacent radio channels should be apart by 20 MHz or more and by 25 MHz or more to prevent a signal from one radio channel from becoming a disturbing wave to a signal of the other radio channel, respectively.

Therefore, the number of radio channels that can be set at the same time in the 5.2 GHz band is a maximum of four channels C1, C2, C3, and C4, shown in FIG. 6. In the 2.4 GHz band is a maximum of three channels C5, C6, and C7 can be set, as shown in FIG. 7.

The transmission rates and modulation systems in the 5.2 GHz can be set in eight modes A1 to A8, shown in FIG. 8, and those in the 2.4 GHz band in four modes B1 to B4, shown in FIG. 9. The terms "modes A1 to A8" and "modes B1 to B4" are not defined in the IEEE 802.11a and IEEE 802.11b standards, but are defined in this specification for convenience.

Modulation systems BPSK, QPSK, QAM, and CCK, shown in FIGS. 8 and 9, are initials for the following: BPSK: Binary Phase Shift Keying, QPSK: Quadrature Phase Shift Keying, QAM: Quadrature Amplitude Modulation, and CCK: Complementary Code Keying.

The modulation systems shown in FIG. 8 and FIG. 9 are multi-value digital modulation (primary modulation) systems for the BBPs 41a and 41b of the base apparatus 10 and for the BBPs 81a and 81b of the display terminal 50, respectively. Orthogonal Frequency Division Multiplexing (OFDM) is used as the radio frequency modulation for the frequency band Ba of the transmitting and receiving portion 45a of the base apparatus 10 and for the transmitting and receiving portion 85a of the display terminal 50. Direct Sequencing (DS) is used as the radio frequency modulation for the frequency band Bb of the transmitting and receiving portion 45b of the base apparatus 10 and of the transmitting and receiving portion 85b of the display terminal 50.

The transmission rate of the mode B4 in the 2.4 GHz band can be higher than that of each of the modes A1 and A2 in the 5.2 GHz band as shown in the FIG. 8 and FIG. 9. Generally, the transmission rate in the 5.2 GHz band can be higher than that in the 2.4 GHz band.

Figure 10:
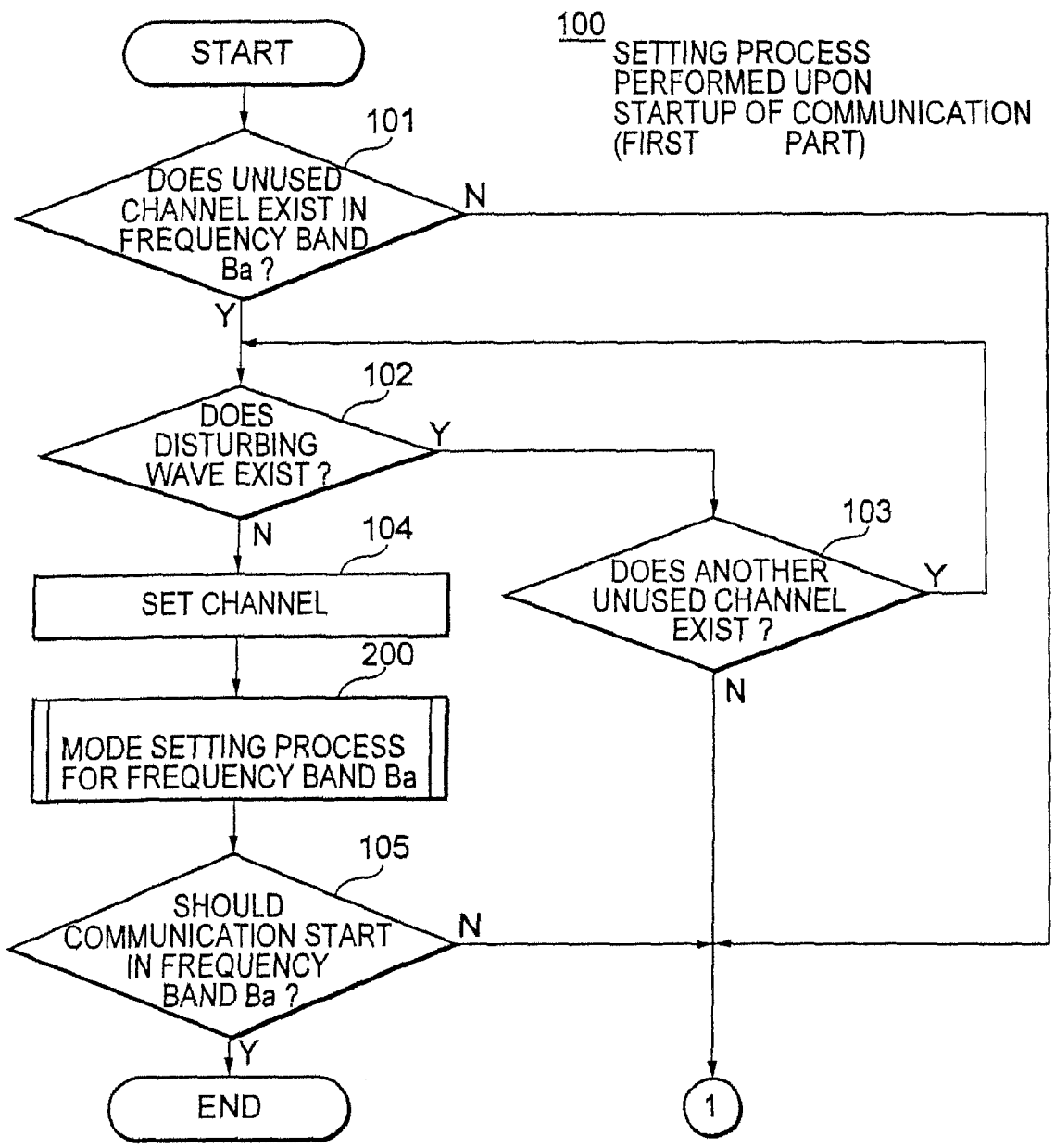
FIG. 10 is a flow diagram showing a first part of an example of a setting process performed upon startup of communication.
Figure 11:
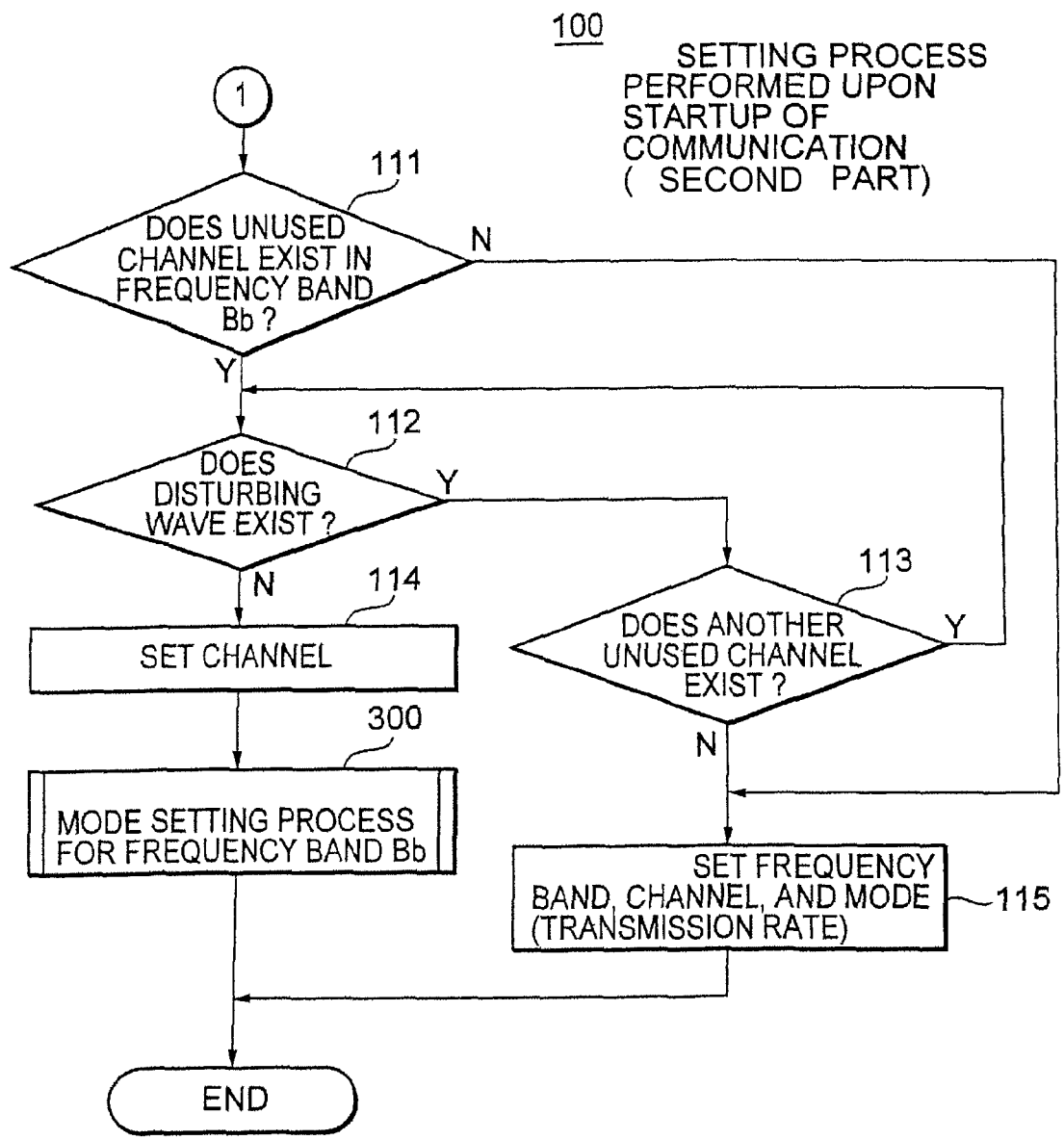
FIG. 11 is a flow diagram showing a second part of the setting process shown in FIG. 10.

Setting Process Performed Upon Startup of Communication: FIG. 10 and FIG. 11:

In the state that the power of the base apparatus 10 has been turned on in the above-described wireless communication system, when the user turns on the power of the display terminal 50 and performs an operation for receiving a television broadcast or performs an operation for accessing the Internet using the display terminal 50, a connection request and a command are transmitted from the display terminal 50 to the base apparatus 10 as signals of a predetermined radio channel of a predetermined frequency band.

After the connection request and command have been received by the base apparatus 10 and the operation for receiving a television broadcast or for accessing the Internet has been performed, a communication with the display terminal 50 is started. Picture and audio data of the television, information of the Internet, and so forth are transmitted from the base apparatus 10 to the display terminal 50.

FIG. 10 and FIG. 11 show an example of a setting process for setting a communication frequency band, a communication channel, and a transmission rate that the controlling portion 30 (CPU 31) of the base apparatus 10 executes.

First, in step 101 of the setting process 100, the controlling portion 30 determines whether an unused channel exists in the frequency band Ba (5.2 GHz band) in which a high transmission rate can be set.

While communication between the base apparatus 10 and a display terminal of the same type as that of the display terminal 50 is performed on a radio channel C1 to C4 as a communication channel in the frequency band Ba, the radio channel is not an unused channel. An unused channel is a radio channel that is not used as a communication channel by the present system.

When the controlling portion 30 determines that an unused channel exists in the frequency band Ba in the step 101, the flow advances to step 102 wherein the controlling portion 30 determines whether a disturbing wave exists on the unused channel based on the detected result of the disturbing wave detecting portion 43a for the frequency band Ba.

A disturbing wave is a communication radio wave transmitted from a wireless communication system that is of the same type as or of a different type than the present system. Alternatively, the disturbing wave is a radio wave transmitted from a non-wireless communication apparatus, such as a microwave oven.

When determining whether a signal received by the transmitting and receiving portion 45a is a disturbing wave, the disturbing wave detecting portion 43a and the controlling portion 30 detect whether transmission destination address information is contained in a received signal that has been processed in the BBP 41*a*. When the transmission destination address information is contained therein, the controlling portion 30 determines whether the transmission destination address information matches an apparatus address of the base apparatus 10.

When transmission destination address information is contained in the received signal and matches the apparatus address (identification information that identifies an apparatus) of the base apparatus 10, the controlling portion 30 determines that the received signal is not a disturbing signal but is instead a signal transmitted from the display terminal 50 to the base apparatus 10. When the received signal is a radio wave of other than a communication radio wave of another wireless communication system and transmission destination address information is not contained in the received signal or when the received signal is a communication radio wave of another wireless communication system and transmission destination address information contained in the received signal, the controlling portion 30 determines that the received signal is a disturbing wave.

However, the system may be structured in a manner that, when the controlling portion 30 has determined that a received signal is a disturbing wave and the received field strength detecting portion 47*a* determines that the received field strength is so low that it can be ignored, as shown in step 102, the controlling portion 30 determines that a disturbing wave does not exist on the unused channel.

When the controlling portion 30 has determined that a disturbing wave exists on the unused channel in step 102, the flow advances to step 103 in which the controlling portion 30 determines whether another unused channel exists. When another unused channel exists, the flow returns to step 102 where, in the same manner as described above, the controlling portion 30 determines whether a disturbing wave exists on the unused channel.

When the controlling portion 30 has determined that a disturbing wave does not exist on the unused channel in step 102, the flow advances to step 104. After the controlling portion 30 has set the unused channel as a communication channel in step 104, the flow advances to process routine 200. In process routine 200, the controlling portion 30 executes a mode setting process for the frequency band Ba.

In the mode setting process 200 for this frequency band Ba, as will be described later with reference to FIG. 12 and FIG. 13, the controlling portion 30 detects received field strengths at transmission rates in decreasing order starting from higher transmission rates on the communication channel that has been set in step 104 of process routine 100. The controlling portion 30 sets as a mode the highest transmission rate at which the received field strength reaches or exceeds a predetermined threshold value.

After the controlling portion 30 has executed the mode setting process 200, the flow advances to step 105 where the controlling portion 30 determines whether communication should start in the frequency band Ba. When it is determined that the communication should start in the frequency band Ba, the controlling portion 30 completes the setting process. The controlling portion 30 starts the communication in the mode (transmission rate) that was set in the process 200 on the communication channel that was set in step 104.

When the controlling portion 30 has determined that an unused channel does not exist in the frequency band Ba in step 101, has determined that an unused channel free of a disturbing wave does not exist in the frequency band Ba) in step 103, or has determined that an unused channel free of a disturbing wave exists in the frequency band Ba but the received field strengths at all the transmission rates do not exceed the threshold value) in step 105, the flow advances to step 111 wherein the controlling portion 30 determines whether an unused channel exists in the frequency band Bb (2.4 GHz band).

When the controlling portion 30 has determined that an unused channel exists in the frequency band Bb, the flow advances from step 111 to step 112, and the controlling portion 30 determines whether a disturbing wave exists on the unused channel in accordance with the detected result of the disturbing wave detecting portion 43*b* for the frequency band Bb.

In this case, the controlling portion 30 determines whether the signal received by the transmitting and receiving portion 45*b* is a disturbing wave and whether a disturbing wave exists on an unused channel in the same manner as set out in step 102.

When the controlling portion 30 has determined that a disturbing wave exists on the unused channel in step 112, the flow advances to step 113 wherein the controlling portion 30 determines whether another unused channel exists. When the controlling portion 30 has determined that another unused channel exists, the flow returns to step 112 where, in the same manner as described above, the controlling portion 30 determines whether a disturbing wave exists on the unused channel.

When the controlling portion 30 has determined that a disturbing wave does not exist on the unused channel in step 112, the flow advances to step 114 wherein the controlling portion 30 sets the unused channel as a communication channel. Thereafter, the flow advances to process routine 300 in which the controlling portion 30 executes a mode setting process for the frequency band Bb.

In the mode setting process 300 for the frequency band Bb, as will be described later with reference to FIG. 14, the controlling portion 30 detects a received field strength at the highest transmission rate on the communication channel that was set in step 114 of the setting process 100. When the received field strength reaches or exceeds the threshold value, the controlling portion 30 sets the transmission rate as a mode. When the received field strength does not reach the threshold value, the controlling portion 30 sets the next highest transmission rate as a mode.

When the controlling portion 30 has determined that an unused channel does not exist in the frequency band Bb in step 111 or has determined that an unused channel free of a disturbing wave does not exist in the frequency band Bb, the flow advances to step 115. As step 115 shows, the controlling portion 30 sets a predetermined radio channel in a predetermined frequency band as a communication channel and sets a predetermined mode (transmission rate). For example, the controlling portion 30 sets a particular radio channel in the frequency band Ba (5.2 GHz band) as a communication channel and sets mode A8 (transmission rate: 54 Mbps) as a mode of the transmission rate. Thereafter, the controlling portion 30 completes the setting process performed upon startup of communication and starts the communication.

Alternatively, in place of step 115 of process 100, the controlling portion 30 transmits a message indicating that data cannot be transmitted due to an improper communication environment between the base apparatus 10 and the display terminal 50 and then causes the message to be displayed on the LCD 51 of the display terminal 50 or to be outputted as audio data from the speaker 55 to inform the user.

Figure 12:
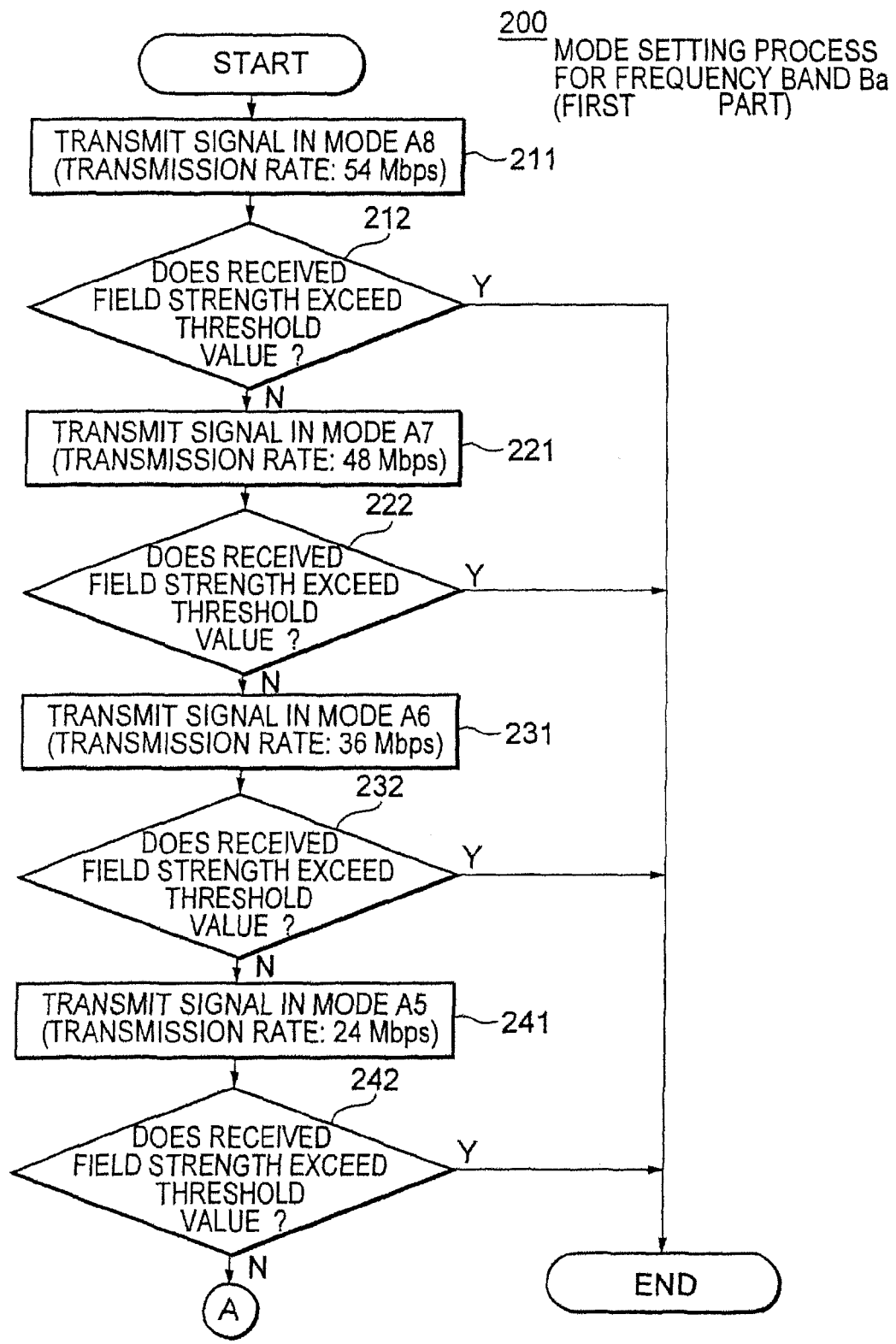
FIG. 12 is a flow diagram showing a first part of an example of a mode setting process for the 5.2 GHz band.
Figure 13:
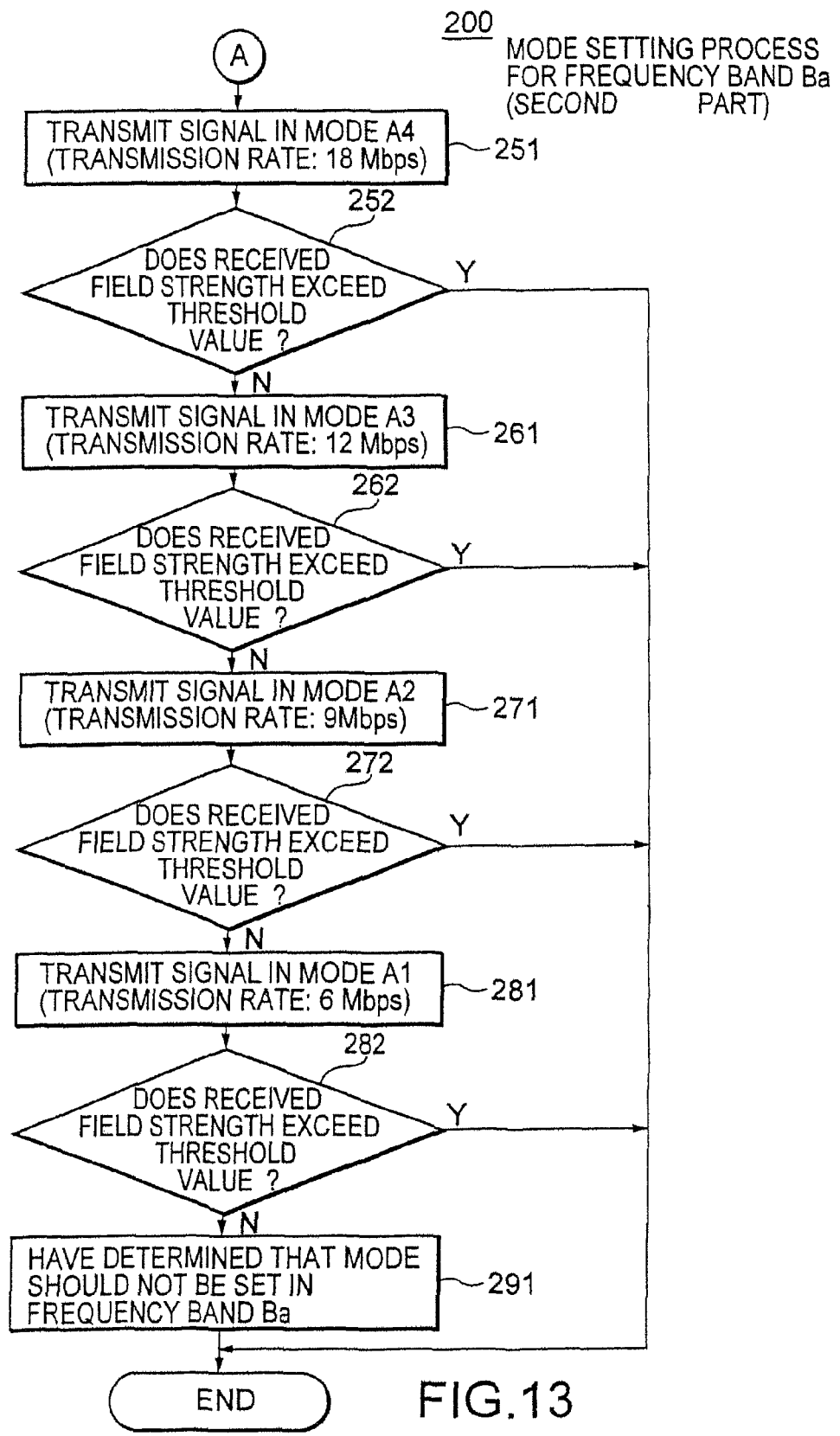
FIG. 13 is a flow diagram showing a second part of the mode setting process shown in FIG. 12.

Mode Setting Process for Frequency Band Ba: FIG. 12 and FIG. 13:

FIGS. 12 and 13 show an example of a process routine 200 of a mode setting process for the frequency band Ba (5.2 GHz band).

When the controlling portion 30 starts communication in mode setting process e 200, the controlling portion 30 has already set an unused channel free of a disturbing wave in the frequency band Ba as a communication channel in setting process 100. Thereafter, in step 211, the controlling portion 30 transmits a setup signal in mode A8 (transmission rate: 54 Mbps), which has the highest transmission rate in the frequency band Ba, from the base apparatus 10 to the display terminal 50.

Thereafter, the flow advances to step 212 wherein the controlling portion 30 determines whether the received field strength at the time reaches or exceeds the threshold value.

As an example, the following method for detecting and determining the received field strength may be used. The transmitting and receiving portion 85a of the display terminal 50 receives a signal transmitted from the base apparatus 10. The received field strength detecting portion 87a of the display terminal 50 detects the received field strength. The controlling portion 70 of the display terminal 50 determines whether the received field strength reaches or exceeds the threshold value and transmits the result from the display terminal 50 to the base apparatus 10. The controlling portion 30 of the base apparatus 10 then determines whether the received field strength reaches or exceeds the threshold value.

Alternatively, when the display terminal 50 has received a signal from the base apparatus 10, the display terminal 50 transmits an acknowledge signal to the base apparatus 10 that notifies the base apparatus 10 that the display terminal 50 has received the signal. The transmitting and receiving portion 45a of the base apparatus 10 receives the acknowledge signal. The received field strength detecting portion 47a of the base apparatus 10 then detects the received field strength. The controlling portion 30 of the base apparatus 10 next determines whether the received field strength reaches or exceeds the threshold value.

When the controlling portion 30 has determined that the received field strength in mode A8 reaches or exceeds the threshold value in step 212, the controlling portion 30 completes the mode setting process for the frequency band Ba. When the controlling portion 30 starts the communication, the flow advances to step 105 of the setting process 100. In step 105, the controlling portion 30 determines that the communication should start in the frequency band Ba and then starts communication in mode A8 on the communication channel that was set in step 104.

When the controlling portion 30 has determined that the received field strength in mode A8 does not reach the threshold value in step 212, the flow advances to step 221. Here, the controlling portion 30 transmits a setup signal in mode A7 (transmission rate: 48 Mbps), which has the second highest transmission rate in the frequency band Ba, from the base apparatus 10 to the display terminal 50. Thereafter, the flow advances to step 222 wherein the controlling portion 30 determines whether the received field strength at the time reaches or exceeds the threshold value in the same manner as described above.

Thereafter, when the controlling portion 30 has determined that the received field strength in mode A7 reaches or exceeds the threshold value in step 222, the controlling portion 30 completes the mode setting process for the frequency band Ba. When the controlling portion 30 starts communication, the flow advances to step 105 of the setting process 100 wherein the controlling portion 30 determines that the communication should start in the frequency band Ba and starts the communication in mode A7 on the communication channel that was set in step 104.

When the controlling portion 30 has determined that the received field strength in mode A7 does not reach the threshold value in step 222, the flow advances to step 231. Here, the controlling portion 30 transmits a setup signal in mode A6 (transmission rate: 36 Mbps) from the base apparatus 10 to the display terminal 50. Thereafter, the flow advances to step 232 wherein the controlling portion 30 determines whether the received field strength at the time reaches or exceeds the threshold value in the manner described above.

When the controlling portion 30 has determined that the received field strength in mode A6 reaches or exceeds the threshold value in step 232, the controlling portion 30 completes the mode setting process for the frequency band Ba. When the controlling portion 30 starts communication in the setting process 100, the controlling portion 30 starts the communication in mode A6 in the same manner as described above.

When the controlling portion 30 has determined that the received field strength in mode A6 does not reach the threshold value in step 232, the flow advances to step 241. Here, the controlling portion 30 transmits a setup signal in mode A5 (transmission rate: 24 Mbps) from the base apparatus 10 to the display terminal 50. Thereafter, the flow advances to step 242. The controlling portion 30 determines whether the received field strength at the time reaches or exceeds the threshold value in the above-described manner.

When the controlling portion 30 has determined that the received field strength in mode A5 reaches or exceeds the threshold value in step 242, the controlling portion 30 completes the mode setting process for the frequency band Ba. When the controlling portion 30 then starts communication in the setting process 100, the controlling portion 30 starts the communication in mode A5 in the same manner as described above.

When the controlling portion 30 has determined that the received field strength in mode A5 does not reach the threshold value in step 242, the flow advances to step 251. Now, the controlling portion 30 transmits a setup signal in mode A4 (transmission rate: 18 Mbps) from the base apparatus 10 to the display terminal 50. Thereafter, the flow advances to step 252 in which the controlling portion 30 determines whether the received field strength at the time reaches or exceeds the threshold value as described above.

When the controlling portion 30 has determined that the received field strength in mode A4 reaches or exceeds the threshold value in step 252, the controlling portion 30 completes the mode setting process for the frequency band Ba. When the controlling portion 30 next starts communication in the setting process 100, the controlling portion 30 starts the communication in mode A4 in the manner as described above.

When the controlling portion 30 has determined that the received field strength in mode A4 does not reach the threshold value in step 252, the flow advances to step 261. Wherein, the controlling portion 30 transmits a setup signal in mode A3 (transmission rate: 12 Mbps) from the base apparatus 10 to the display terminal 50. Thereafter, the flow advances to step 262 in which the controlling portion 30 determines whether the received field strength at the time reaches or exceeds the threshold value in the same method as described above.

When the controlling portion 30 has determined that the received field strength in mode A3 reaches or exceeds the threshold value in step 262, the controlling portion 30 completes the mode setting process for the frequency band Ba. When the controlling portion 30 thereafter starts communication in process routine 100, the controlling portion 30 starts the communication in mode A3 in the manner described above.

When the controlling portion 30 has determined that the received field strength in mode A3 does not reach the threshold value in step 262, the flow advances to step 271. Here, the controlling portion 30 transmits a setup signal in mode A2 (transmission rate: 9 Mbps) from the base apparatus 10 to the display terminal 50. Thereafter, the flow advances to step 272. The controlling portion 30 determines whether the received field strength at the time reaches or exceeds the threshold value in the same method as described above.

When the controlling portion 30 has determined that the received field strength in mode A2 reaches or exceeds the threshold value in step 272, the controlling portion 30 completes the mode setting process for the frequency band Ba. When the controlling portion 30 subsequently starts a communication in the process 100, the controlling portion 30 starts the communication in mode A2 in the same manner as described above.

When the controlling portion 30 has determined that the received field strength in mode A2 does not reach the threshold value in step 272, the flow advances to step 281. Where, the controlling portion 30 transmits a setup signal in mode A1 (transmission rate: 6 Mbps), which has the lowest transmission rate in the frequency band Ba, from the base apparatus 10 to the display terminal 50. Thereafter, the flow advances to step 282 in which the controlling portion 30 determines whether the received field strength at the time reaches or exceeds the threshold value as described above.

When the controlling portion 30 has determined that the received field strength in mode A1 reaches or exceeds the threshold value in step 282, the controlling portion 30 completes the mode setting process for the frequency band Ba. When the controlling portion 30 next starts a communication in the process 100, the controlling portion 30 starts the communication in mode A1 in the same manner as described above.

When the controlling portion 30 has determined that the received field strength in mode A1 does not reach the threshold value in step 282, the flow advances to step 291. In step 291, the controlling portion 30 has determined that no mode should be set in the frequency band Ba and completes the mode setting process for the frequency band Ba. When the controlling portion 30 starts communication, the flow advances to step 105 of the setting process 100 wherein the controlling portion 30 has determined that a communication should not start in the frequency band Ba. Here, as when the controlling portion 30 has determined that an unused channel does not exist in the frequency band Ba in step 101 or 30 has determined that an unused channel free of a disturbing wave does not exist in the frequency band Ba in step 103, the flow advances to step 111 as described above.

When the communication environment does not vary, the received sensitivity point, namely the received field strength of which the bit error rate of the received data does not reach a predetermined value, becomes higher, as the transmission rate is increased. Therefore, the threshold values at the above-described steps 212, 222, 232, 242, 252, 262, 272, and 282 are increased as the transmission rate increases.

Figure 14:
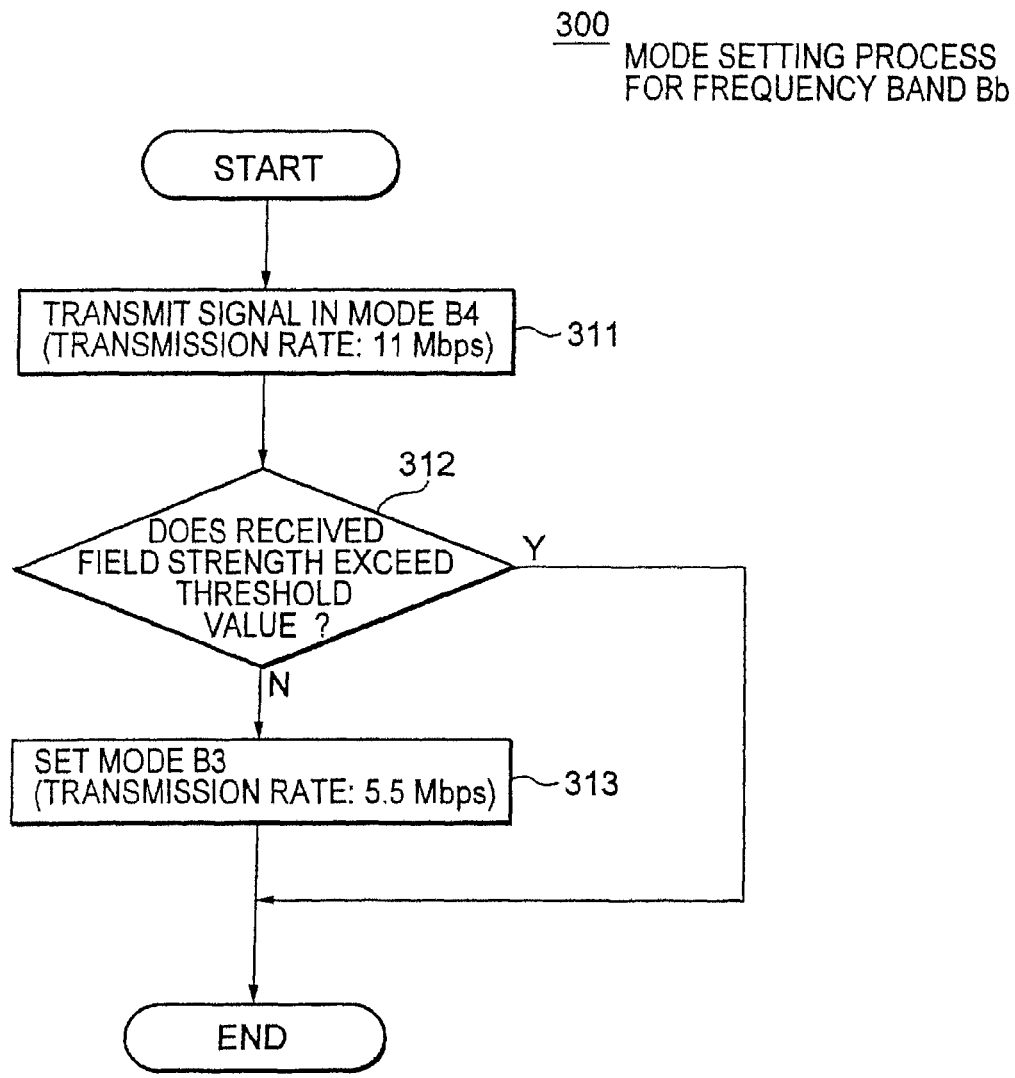
FIG. 14 is a flow diagram showing an example of a mode setting process for the 2.4 GHz band.

Mode Setting Process for Frequency Band Bb: FIG. 14:

FIG. 14 shows an example of a mode setting process 300 for the frequency band Bb (2.4 GHz band).

When the controlling portion 30 starts communication in the process 300, the flow first returns to step 114 of the process 100. In step 114, the controlling portion 30 sets an unused channel free of a disturbing wave in the frequency band Bb as a communication channel. Thereafter, the flow advances to step 311 where the controlling portion 30 transmits a setup signal in mode B4, which has the highest transmission rate in the frequency band Bb (transmission rate: 11 Mbps), from the base apparatus 10 to the display terminal 50.

Thereafter, the flow advances to step 312 in which the controlling portion 30 determines whether the received field strength at the time reaches or exceeds the threshold value.

As an example, the following method for detecting and determining the received field strength may be used. The transmitting and receiving portion 85b of the display terminal 50 receives a signal transmitted from the base apparatus 10. The received field strength detecting portion 87b of the display terminal 50 then detects the received field strength. The controlling portion 70 of the display terminal 50 then determines whether the received field strength reaches or exceeds the threshold value and transmits the result from the display terminal 50 to the base apparatus 10. The controlling portion 30 of the base apparatus 10 thereafter determines whether the received field strength reaches or exceeds the threshold value.

Alternatively, when the display terminal 50 has received a signal transmitted from the base apparatus 10, the display terminal 50 transmits an acknowledge signal to the base apparatus 10 that notifies the base apparatus that the display terminal 50 has received the signal. The transmitting and receiving portion 45b of the base apparatus 10 next receives the acknowledge signal. The received field strength detecting portion 47b of the base apparatus 10 then detects the received field strength. The controlling portion 30 of the base apparatus 10 subsequently determines whether the received field strength reaches or exceeds the threshold value.

When the controlling portion 30 has determined that the received field strength in mode B4 reaches or exceeds the threshold value in step 312, the controlling portion 30 completes the mode setting process for the frequency band Bb and starts the communication in mode B4 on the communication channel that has been set in step 114 of the process 100.

When the controlling portion 30 has determined that the received field strength in mode B4 does not reach the threshold value in step 312, the flow advances to step 313. Here, the controlling portion 30 sets mode B3 (transmission rate: 5.5 Mbps), which has the second highest transmission rate in the frequency band Bb, completes the mode setting process for the frequency band Bb and then starts the communication in mode B3 on the communication channel that has been set in step 114 of the setting process 100.

When the received field strength in mode B4 does not reach the threshold value, the controlling portion 30 sets mode B3 without determining whether the received field strength in mode B3 reaches or exceeds the threshold value because if the received field strength in mode B3 did not exceed the threshold value and the controlling portion 30 were to set mode B2 (transmission rate: 2 Mbps) or mode B1 (transmission rate: 1 Mbps), the resulting transmission rate would become too low.

Alternatively, the mode setting process 300 may be structured in the following manner. When the controlling portion 30 has determined that the received field strength in mode 34 does not reach the threshold value in step 312, the controlling portion 30 transmits a setup signal in mode B3 to the display terminal 50 and then determines whether the received field strength in mode B3 reaches or exceeds the threshold value. When the received field strength reaches or exceeds the threshold value, the controlling portion 30 sets mode B3.

When the received field strength does not reach the threshold value, the controlling portion 30 determines that no mode is to be set in the frequency band Bb.

When the controlling portion 30 has determined that no mode is to be set in the frequency band Bb in the process 300, in the same manner that the controlling portion 30 determines that an unused channel exists in the frequency band Bb in step 111 or determines that an unused channel free of a disturbing wave does not exist in the frequency band Bb in step 113, the flow advances to step 115. In step 115, the controlling portion 30 sets a predetermined radio channel of a predetermined frequency band as a communication channel, sets a predetermined mode (transmission rate), and starts the communication.

Changing Process that is Performed During Communication: FIG. 15 to FIG. 21:

Changing Process that is Performed During Normal Communication: FIG. 15 to FIG. 18:

When the controlling portion 30 starts communication at a high transmission rate in the frequency band Ba, if a disturbing wave is present in a communication channel, it is desirable to change the communication channel. Moreover, when the controlling portion 30 starts communication at a low transmission rate in the frequency band Bb and an unused channel now exists in the frequency band Ba, it is desirable to change the communication channel to the unused channel in the frequency band Ba to increase the transmission rate.

Therefore, the above-described wireless communication system is structured such that while the base apparatus 10 is communicating with the display terminal 50, the controlling portion 30 of the base apparatus 10 executes a changing process.

Figure 15:
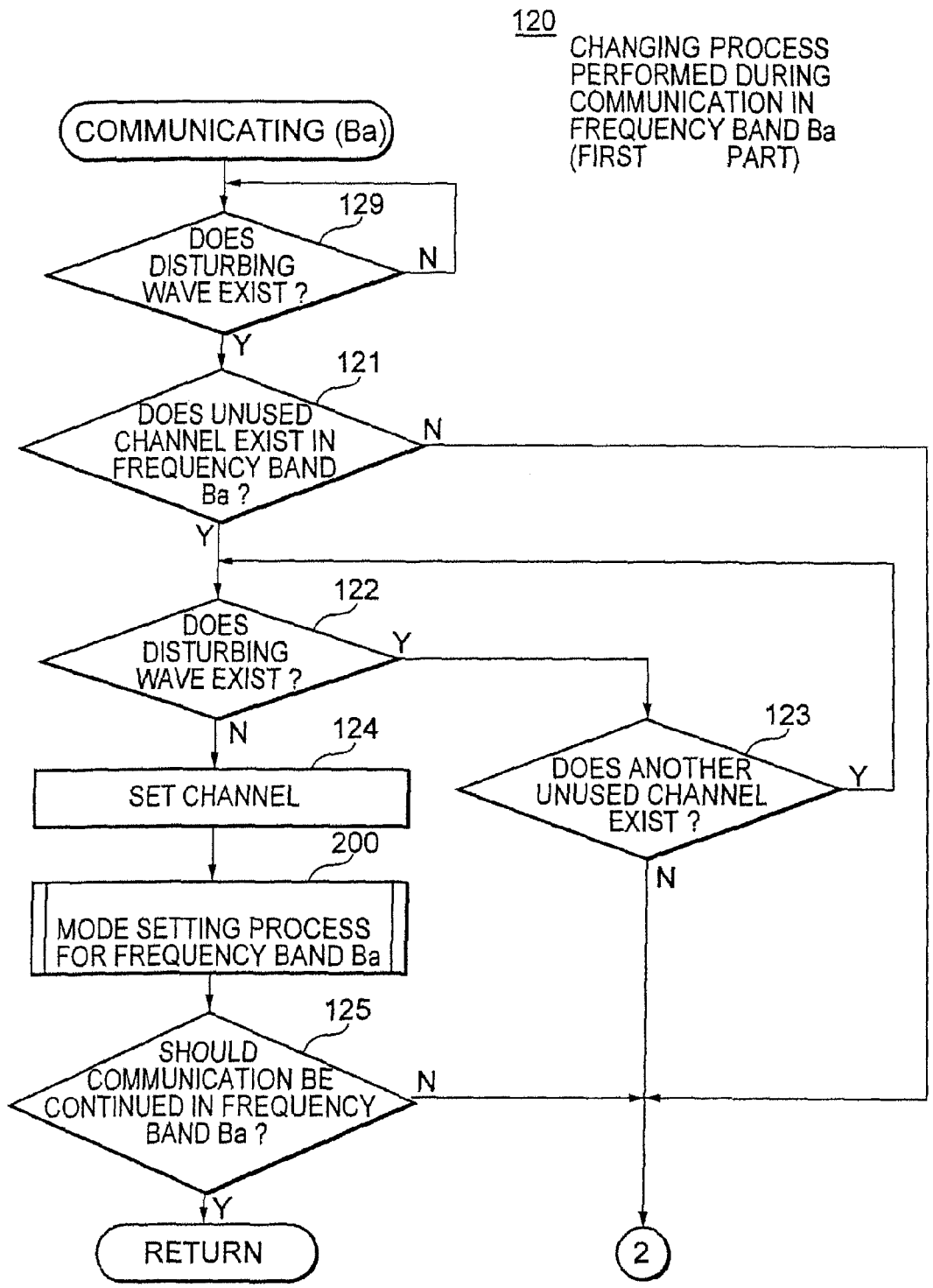
FIG. 15 is a flow diagram showing a first part of an example of a changing process performed during communication in the 5.2 GHz band.
Figure 16:
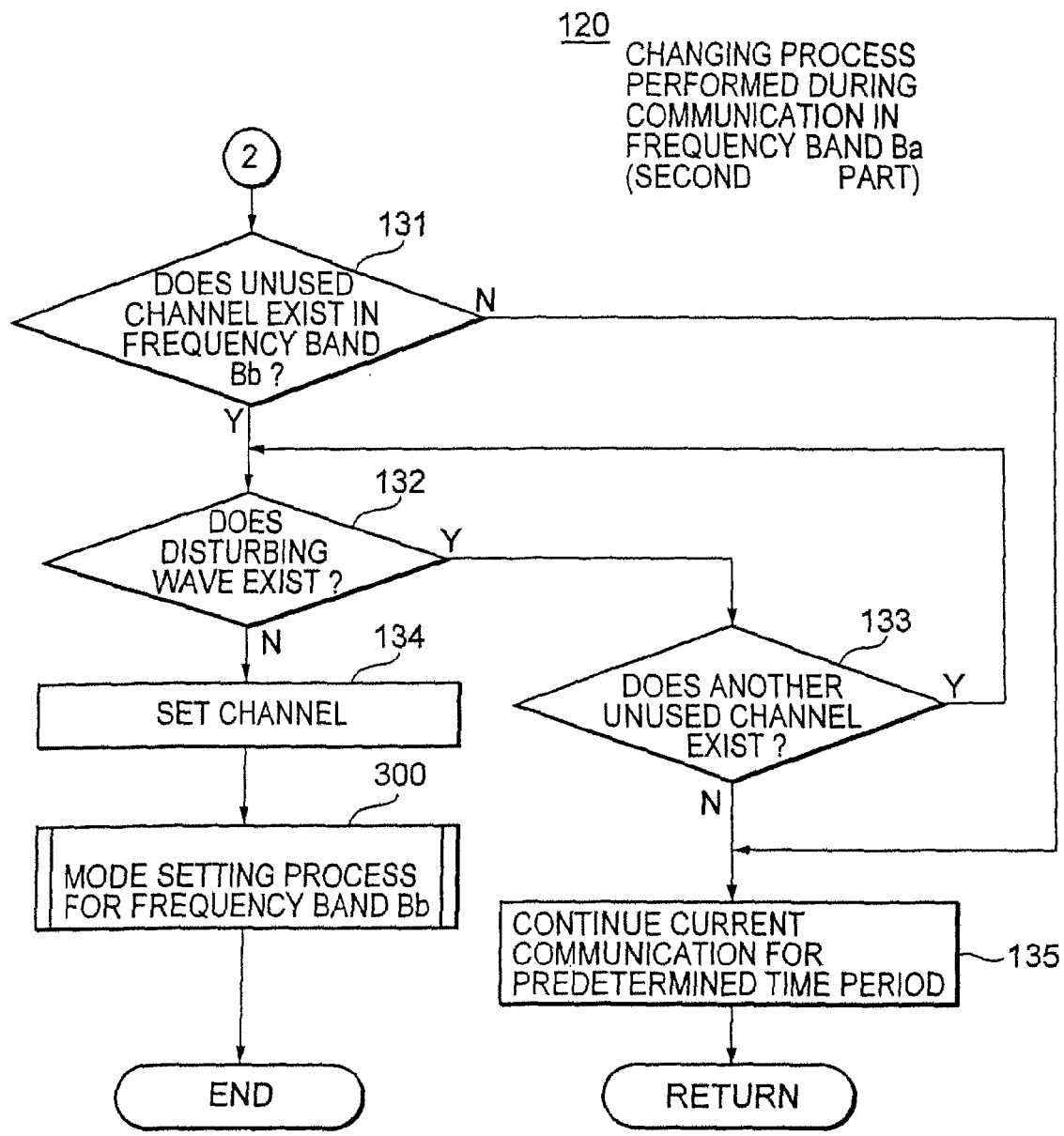
FIG. 16 is a flow diagram showing a second part of the changing process shown in FIG. 15.

Changing Process Performed During Communication in Frequency Band Ba: FIG. 15 and FIG. 16:

FIG. 15 and FIG. 16 show an example of a changing process 120 performed during communication in the frequency band Ba.

While the controlling portion 30 is communicating in the frequency band Bb, in step 129 of process routine 120, the controlling portion 30 periodically determines whether a disturbing wave exists on a communication radio channel in the frequency band Ba in accordance with the detected result of the disturbing wave detecting portion 43a.

In this case, as in the setting process 100 performed upon startup of communication, when the controlling portion 30 determines whether a signal received by the transmitting and receiving portion 45a is a disturbing wave, the above-described method for detecting/identifying transmission destination address information is used.

When the controlling portion 30 has determined that a disturbing wave exists on the communication radio channel in step 129, the controlling portion 30, in step 121, determines whether an unused channel exists in the frequency band Ba. When it is determined that an unused channel exists, the flow advances to step 122 wherein the controlling portion 30 determines whether a disturbing wave exists on the unused channel. When such a disturbing wave is found to exist, the flow advances to step 123 where the controlling portion 30 determines whether or not another unused channel exists. When it is determined that an unused channel exists, the flow returns to step 122 in which the controlling portion 30 determines whether a disturbing wave exists on the unused channel.

When the controlling portion 30 has determined that a disturbing wave does not exist on the unused channel in step 122, the flow advances to step 124 wherein the controlling portion 30 sets the unused channel as a communication channel. Thereafter, the controlling portion 30 executes the mode setting process 200 for the frequency band Ba. Thereafter, the flow advances to step 125 in which the controlling portion 30 determines whether the communication should be continued in the frequency band Ba in accordance with the result of the execution of the process 200. When the controlling portion 30 has determined that the communication should be continued in the frequency band Ba, the controlling portion 30 restores the communicating state in the frequency band Ba.

When the controlling portion 30 has determined that an unused channel does not exist in the frequency band Ba in step 121, has determined that an unused channel free of a disturbing wave does not exist in the frequency band Ba in step 123, or has determined that an unused channel free of a disturbing wave exists in the frequency band Ba but the received field strengths at all the transmission rates in the frequency band Ba do not exceed the threshold value in step 125, the flow advances to step 131. Namely, the controlling portion 30 determines whether an unused channel exists in the frequency band Bb.

When the controlling portion 30 has determined that an unused channel exists in the frequency band Bb, the flow advances from step 131 to step 132 wherein the controlling portion 30 determines whether a disturbing wave exists on the unused channel. When it is determined that a disturbing wave exists, the flow advances to step 133 in which the controlling portion 30 determines whether another unused channel exists. When another unused channel exists, the flow returns to step 132. Namely, the controlling portion 30 determines whether or not a disturbing wave exists on the unused channel.

When the controlling portion 30 has determined that a disturbing wave does not exist on the unused channel in step 132, the flow advances to step 134 wherein the controlling portion 30 sets the unused channel as a communication channel. Thereafter, the controlling portion 30 executes the mode setting process 300 for the frequency band Bb. The controlling portion 30 completes the changing process performed during communication in the frequency band Ba and enters a communicating state in the frequency band Bb.

When the controlling portion 30 has determined that an unused channel does not exist in the frequency band Bb in step 131 or has determined that an unused channel free of a disturbing wave does not exist in the frequency band Bb in step 133, the flow advances to step 135. Namely, the controlling portion 30 continues the current communication for a predetermined time period and restores the communicating state in the frequency band Ba.

Figure 17:
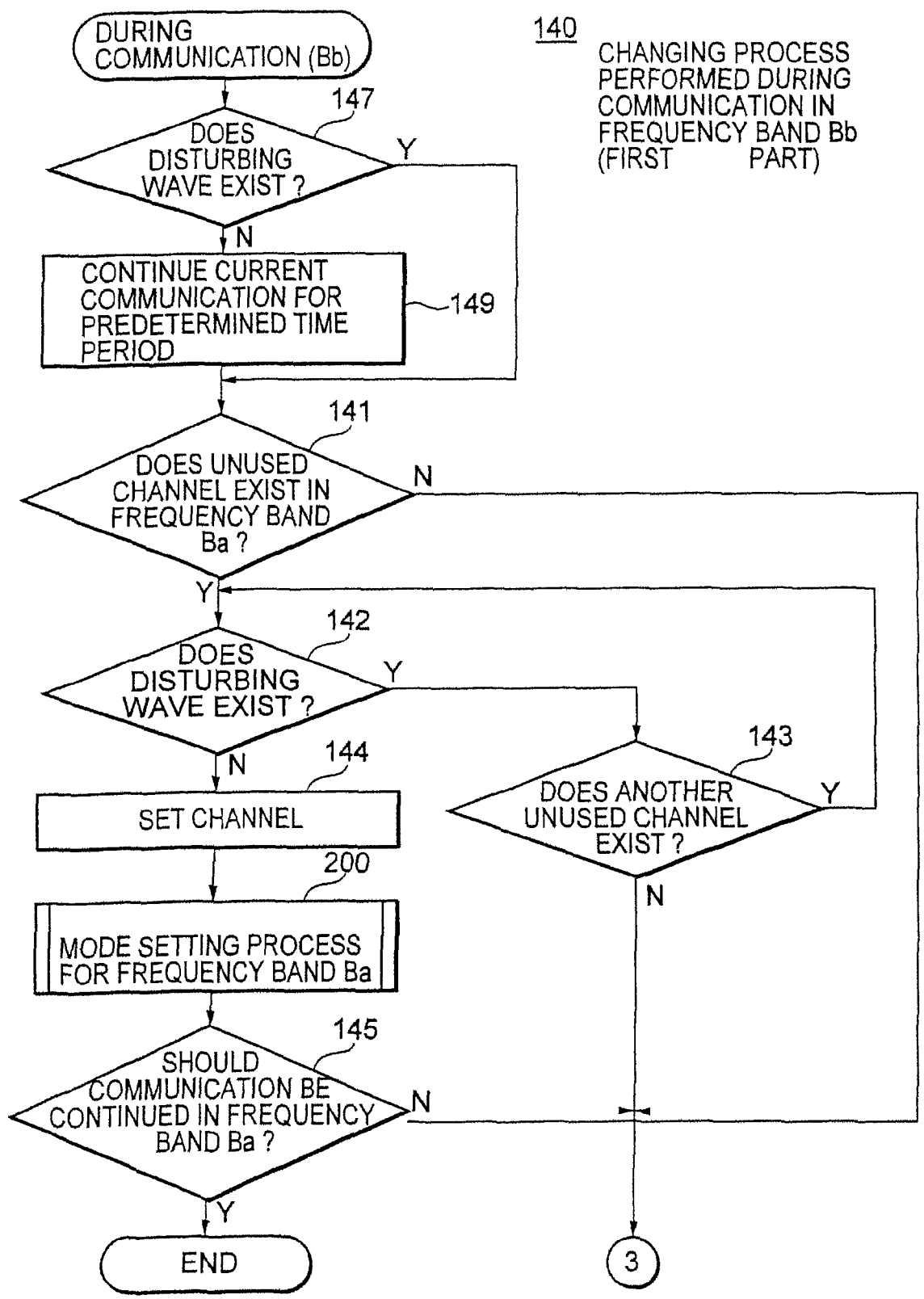
FIG. 17 is a flow diagram showing a first half part of an example of a changing process performed during communication in the 2.4 GHz band.
Figure 18:
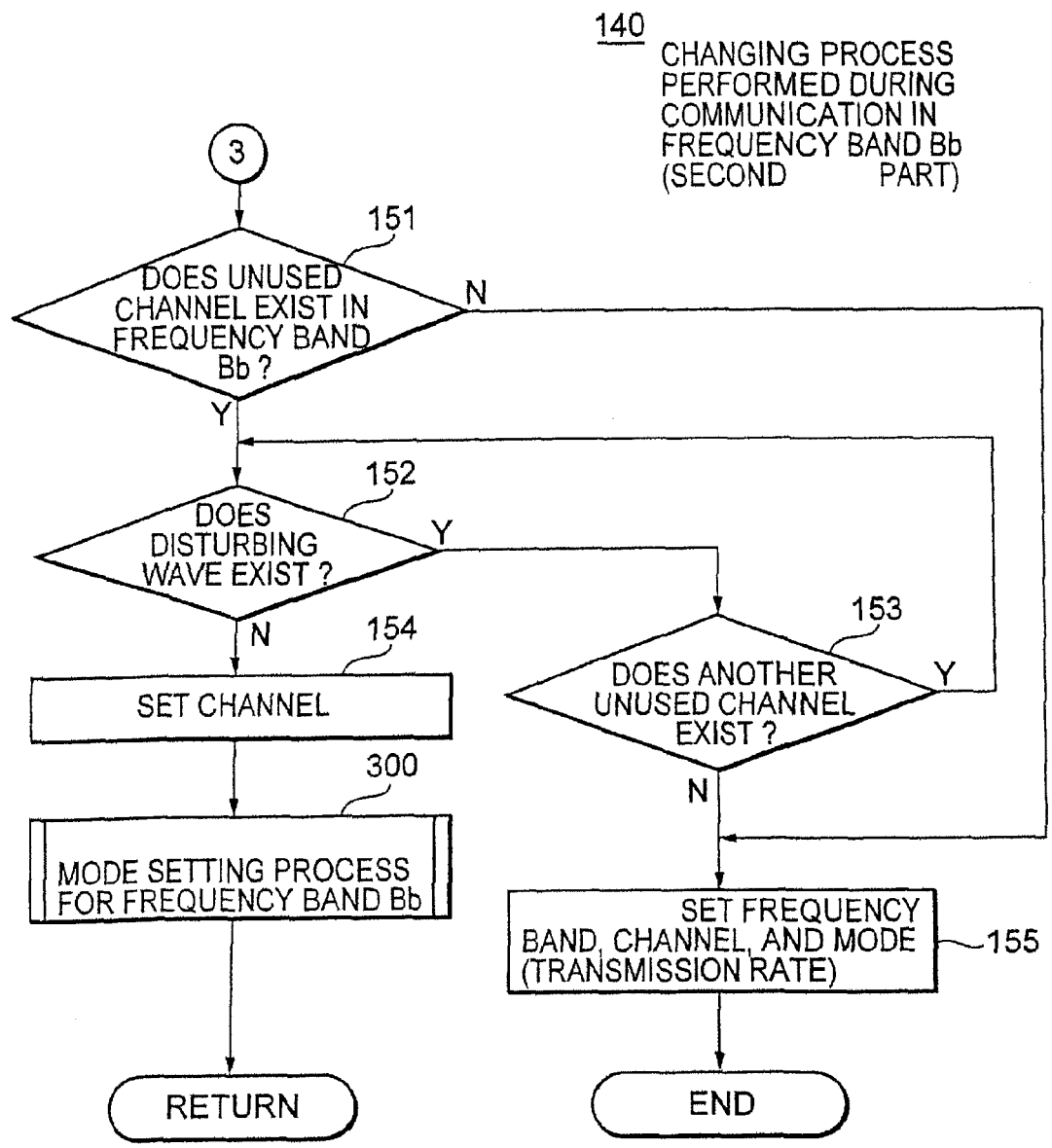
FIG. 18 is a flow diagram showing a second part of the changing process shown in FIG. 17.

Changing Process Performed During Communication in Frequency Band Bb: FIG. 17 and FIG. 18:

FIG. 17 and FIG. 18 show an example of a changing process performed during communication in the frequency band Bb.

In changing process routine 140, while the controlling portion 30 is communicating, in step 147, the controlling portion 30 periodically determines whether a disturbing wave exists on a communication radio channel in accordance with the detected result of the disturbing wave detecting portion 43b.

In this case, as in the setting process routine 100 performed upon startup of communication, when the controlling portion 30 determines whether a signal received by the transmitting and receiving portion 45b is a disturbing wave, the above-described method for detecting/identifying transmission destination address information is used.

When the controlling portion 30 has determined that a disturbing wave exists on the communication radio channel in step 147, the flow directly advances from step 147 to step 141.

When the controlling portion 30 determines that the disturbing wave does not exist on the communication radio channel, the flow advances from step 147 to step 149 wherein the controlling portion 30 continues the current communication for a predetermined time period. Thereafter, the flow advances to step 141.

In step 141, the controlling portion 30 determines whether an unused channel exists in the frequency band Ba, and when an unused channel exists, the flow advances to step 142. Namely, the controlling portion 30 determines whether or not a disturbing wave exists on the unused channel and when a disturbing wave exists, the flow advances to step 143 wherein the controlling portion 30 determines whether another unused channel exists. When it is determined that another unused channel exists, the flow returns to step 142 so that the controlling portion 30 determines whether a disturbing wave exists on the unused channel.

When the controlling portion 30 has determined that a disturbing wave does not exist on the unused channel in step 142, the flow advances to step 144 wherein the controlling portion 30 sets the unused channel as a communication channel. Thereafter, the controlling portion 30 executes a mode setting process 200 for the frequency band Ba. The flow then advances to step 145 in which the controlling portion 30 determines whether the communication should be continued in the frequency band Ba. When it is determined that the communication should be continued in the frequency band Ba, the controlling portion 30 completes the changing process performed during communication in the frequency band Ba. Thereafter, the controlling portion 30 enters a communicating state in the frequency band Ba.

When the controlling portion 30 has determined that an unused channel does not exist in the frequency band Ba in step 141, has determined that an unused channel free of a disturbing wave does not exist in the frequency band Ba) in step 143, or has determined that an unused channel free of a disturbing wave exists in the frequency band Ba but the received field strengths at all the transmission rates in the frequency band Ba do not exceed the threshold value) in step 145, the flow advances to step 151. Namely, the controlling portion 30 determines whether an unused channel exists in the frequency band Bb.

When the controlling portion 30 has determined that an unused channel exists in the frequency band Bb, the flow advances from step 151 to step 152 wherein the controlling portion 30 determines whether a disturbing wave exists on the unused channel. When it is determined that a disturbing wave exists, the flow advances to step 153 in which the controlling portion 30 determines whether another unused channel exists. When the controlling portion 30 has determined that another unused channel exists, the flow returns to step 152. Namely, the controlling portion 30 determines whether or not a disturbing wave exists on the unused channel.

When the controlling portion 30 has determined that a disturbing wave does not exist on the unused channel in step 152, the flow advances to step 154 in which the controlling portion 30 sets the unused channel as a communication channel. Thereafter, the controlling portion 30 executes the mode setting process 300 for the frequency band Bb and restores the communicating state in the frequency band Bb.

When the controlling portion 30 has determined that an unused channel does not exist in the frequency band Bb in step 151 or has determined that an unused channel free of a disturbing wave does not exist in the frequency band Bb in step 153, the flow advances to step 155. Namely, the controlling portion 30 sets, for example, a predetermined radio channel of a predetermined frequency band as a communication channel, sets a predetermined mode (transmission rate), and completes the changing process performed during communication in the frequency band Bb.

Figure 19:
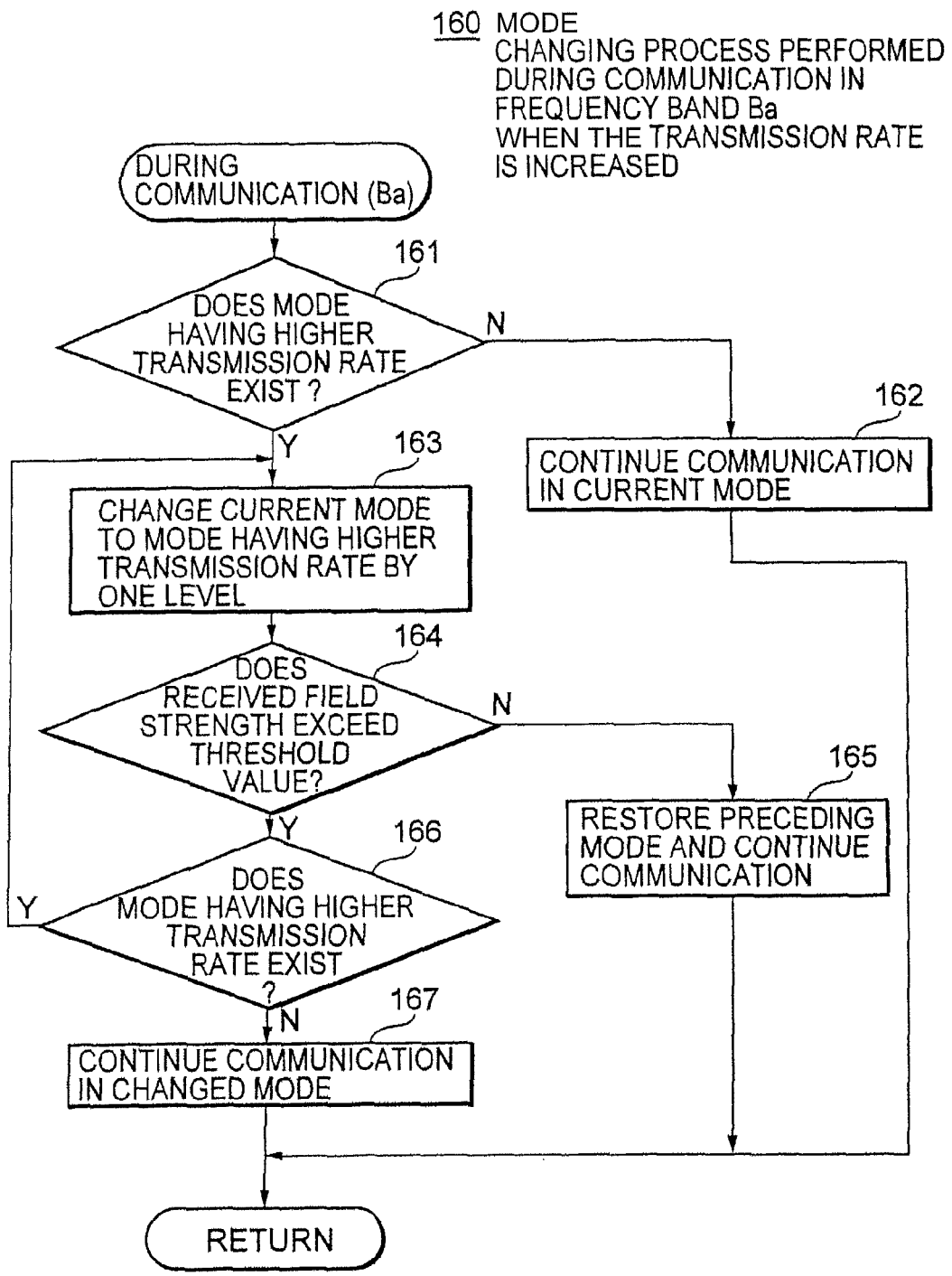
FIG. 19 is a flow diagram showing an example of a mode changing process performed during communication in the 5.2 GHz band when a transmission rate is increased.
Figure 20:
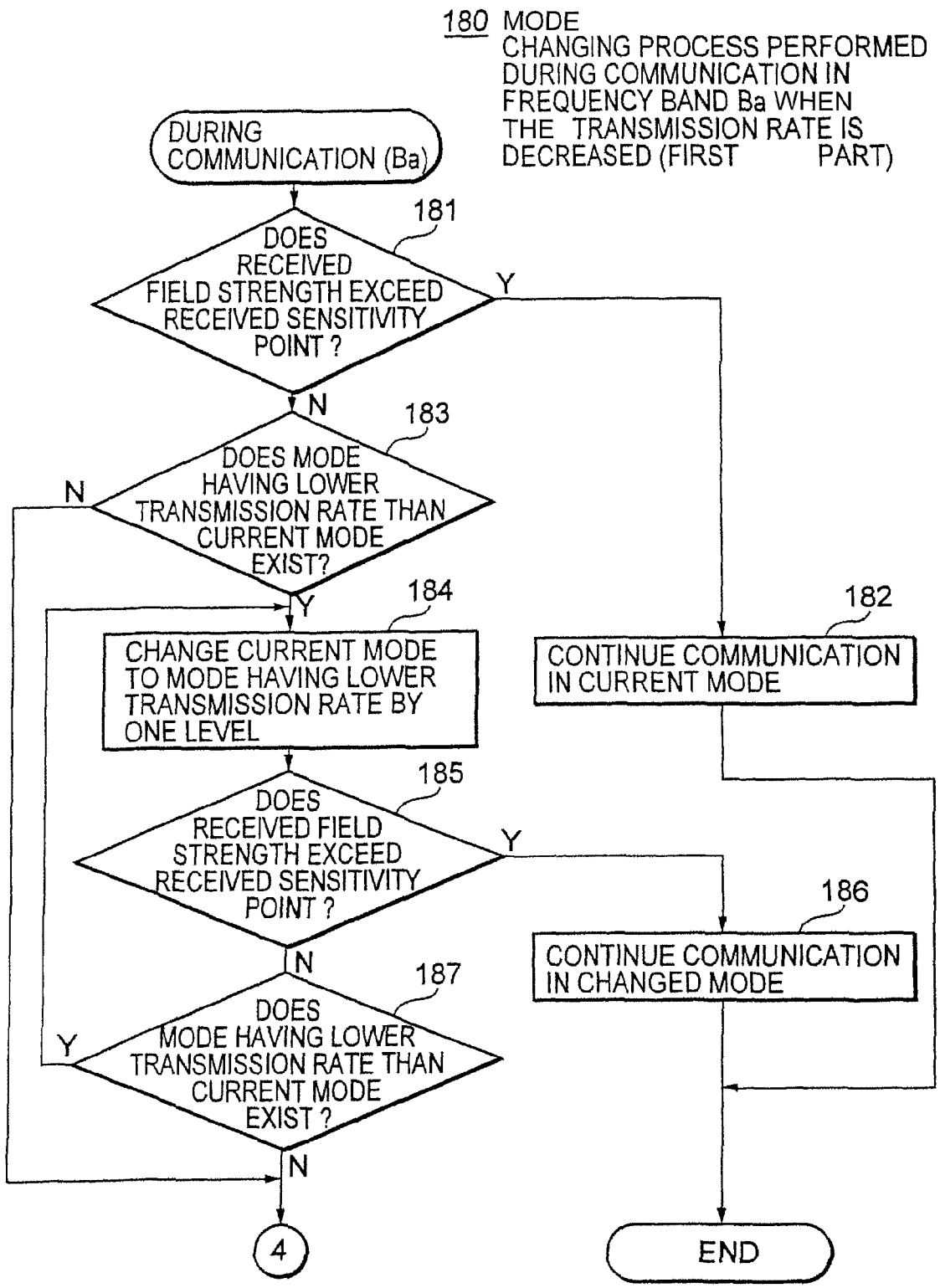
FIG. 20 is a flow diagram showing a first part of an example of a mode changing process performed during communication in the 2.4 GHz band when a transmission rate is decreased.
Figure 21:
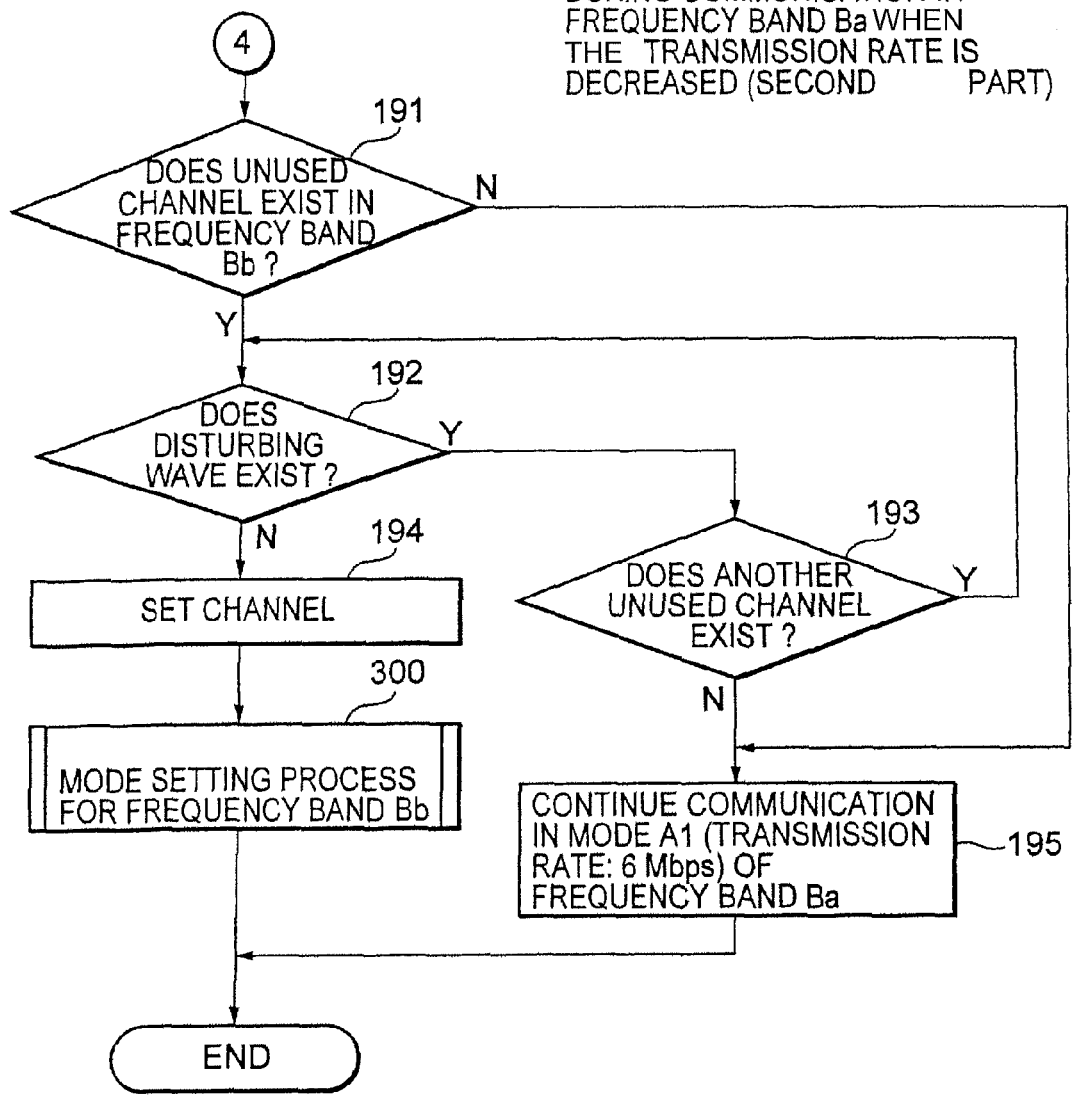
FIG. 21 is a flow diagram showing a second part of the mode changing process shown in FIG. 20.

Change of Transmission Rate: FIG. 19 to FIG. 21:

The Case in which Transmission Rate is Increased: FIG. 19:

When the controlling portion 30 starts a communication in the frequency band Ba, even if the transmission rate cannot be increased because the electric field is weak, if the environment of the electric field varies, the transmission rate may be increased. Thus, the system is structured so that in that case the transmission rate can be increased.

FIG. 19 shows an example of a mode changing process 160 that the controlling portion 30 of the base apparatus 10 executes in such a case.

In the mode changing process 160, while the controlling portion 30 is communicating in the frequency band Ba, it periodically determines whether a mode having a higher transmission rate than the current mode exists. When such a mode does not exist, namely, while the controlling portion 30 is communicating in mode A8 (transmission rate: 54 Mbps), the flow advances to step 162 wherein the controlling portion 30 continues the communication in the current mode (transmission rate).

When a mode that has a higher transmission rate than the current mode exists, namely, during communication in a mode lower than mode A7, the flow advances from step 161 to step 163 wherein the controlling portion 30 changes the current mode to a mode having a higher transmission rate. Thereafter, in step 164, the controlling portion 30 determines whether the received field strength at the changed transmission rate reaches or exceeds the threshold value.

When the received field strength at the changed transmission rate does not reach the threshold value, the flow advances from step 164 to step 165 so that the controlling portion 30 restores the preceding mode (transmission rate) from which the transmission rate was changed in step 163 and continues the communication. When the received field strength at the changed transmission rate reaches or exceeds the threshold value, the flow advances from step 164 to step 166 wherein the controlling portion 30 determines whether a mode having a higher transmission rate than the current mode exists. When such a mode exists, the controlling portion 30 executes steps 163 and the steps after step 163. When a mode having a higher transmission rate than the current mode does not exist, the flow advances to step 167. Namely, the controlling portion 30 continues the communication in the mode (transmission rate) that was changed in step 163.

For example, while the controlling portion 30 is communicating in mode A4, if the received field strength reaches or exceeds the threshold value in mode A5, but not in mode A6, the controlling portion 30 successively executes steps 161, 163, 164, 166, 163, 164, and 165. As a result, the controlling portion 30 changes mode A4 to mode A4.

In contrast, while the controlling portion 30 is communicating in mode A7, if the received field strength reaches or exceeds the threshold value in mode A8, the controlling portion 30 successively executes steps 161, 163, 164, 166, and 167. As a result, the controlling portion 30 changes mode A7 to mode A8.

The Case in which Transmission Rate is Decreased: FIG. 20 and FIG. 21:

In a good environment in which a radio wave is free of a disturbing wave while the controlling portion 30 is communicating at a high transmission rate in the frequency band Ba, if the user having the display terminal 50 goes away from the base apparatus 10, the electric field will vary because the distance between the base apparatus 10 and the display terminal 50 becomes large. In such case, the received field strength becomes lower than the received sensitivity point and as a result, the bit error rate of the received data becomes large and communication cannot be securely performed. Thus, the system is structured for the case where the transmission rate is decreased and the received field strength becomes larger than the received sensitivity point.

FIGS. 20 and 21 show an example of a mode changing process 180 that the controlling portion 30 of the base apparatus 10 executes in such a case.

In the mode changing process 180, while the controlling portion 30 is communicating in the frequency band Ba, it periodically determines whether the received field strength at the current transmission rate reaches or exceeds the received sensitivity point in step 181. When the received field strength does reach or exceed the received sensitivity point, the flow advances to step 182 wherein the controlling portion 30 continues the communication in the current mode (transmission rate).

When the received field strength at that transmission rate does not reach the received sensitivity point, the flow advances from step 181 to step 183. Namely, the controlling portion 30 determines whether a mode having a lower transmission rate than the current mode exists. When such a mode is determined to exist, the flow advances from step 183 to step 184 wherein the controlling portion 30 changes the current mode to a mode having a lower transmission rate by one level. Thereafter, the flow advances to step 185 in which the controlling portion 30 determines whether the received field strength at the changed transmission rate reaches or exceeds the received sensitivity point.

When the received field strength at the changed transmission rate reaches or exceeds the received sensitivity point, the flow advances from step 185 to step 186. Namely, the controlling portion 30 continues the communication in the mode (transmission rate) changed in step 184. When the received field strength at the changed transmission rate does not reach the received sensitivity point, the flow advances from step 185 to step 187 wherein the controlling portion 30 determines whether a mode having a lower transmission rate than the current mode exists. When such a mode exists, the controlling portion 30 repeats the steps starting from step 184.

For example, while the controlling portion 30 is communicating in mode A4, and if the received field strength does not reach the received sensitivity point but does reach or exceed the received sensitivity point in mode A3, the controlling portion 30 successively executes steps 181, 183, 184, 185, and 186. As a result, the controlling portion 30 changes from mode A4 to mode A3.

In contrast, when the controlling portion 30 has determined that a mode having a lower transmission rate than the current mode does not exist in step 183, namely, while the controlling portion 30 is communicating in mode A1, if the received field strength does not reach the received sensitivity point, the flow advances to stop 191. Also, when the controlling portion 30 has determined that a mode having a lower transmission rate than the current mode does not exist in step 187, namely even if the controlling portion 30 decreases the transmission rate to mode A1 but the received field strength does not reach the received sensitivity point, the flow advances to step 191. In step 191, the controlling portion 30 determines whether or not an unused channel exists in the frequency band Bb.

When the controlling portion 30 has determined that an unused channel exists in the frequency band Bb, the flow advances from step 191 to step 192 wherein the controlling portion 30 determines whether or not a disturbing wave exists on the unused channel. When it is determined that a disturbing wave exists, the flow advances to step 193. Namely, the controlling portion 30 determines whether another unused channel exists. When another unused channel exists, the flow returns to step 192 in which the controlling portion 30 determines whether a disturbing wave exists on the unused channel.

When the controlling portion 30 has determined that a disturbing wave does not exist on the unused channel in step 192, the flow advances to step 194, namely, the controlling portion 30 sets the unused channel as a communication channel. Thereafter, the controlling portion 30 executes the mode setting process 300 for the frequency band Bb. Thereafter, the controlling portion 30 enters a communicating state in the frequency band Bb.

When the controlling portion 30 has determined that an unused channel does not exist in the frequency band Bb, in step 191, or has determined that an unused channel free of a disturbing wave does not exist in the frequency band Bb, in step 193, the flow advances to step 195. Here, the controlling portion 30 continues the communication in mode A1 having the lowest transmission rate on the original communication channel in the frequency band Ba, thus providing the highest possibility that the received field strength reaches or exceeds the received sensitivity point.

Other Embodiments

Frequency bands are currently defined in the IEEE standard and domestic standard only at 5.2 GHz (5 GHz band) and at 2.4 GHz. However, it is possible to use other frequency bands as the radio frequency bands of the invention. Other frequency bands may be defined in future. Thus the two frequency bands of the invention are not limited to 5.2 GHz (5 GHz band) and 2.4 GHz. In addition, the present invention can be applied to the case in which three or more frequency bands are used.

In addition, the wireless communication apparatuses that compose the wireless communication system are not limited to the above-described base apparatus and display terminal.

INDUSTRIAL APPLICABILITY

As described above, according to the present invention, in a wireless communication system that deals with a plurality of communicable frequency bands having different transmission rates, a large volume of data can be securely and smoothly transmitted in real time without a disturbance from another wireless communication system and so forth, and abnormalities such as the stopping of a moving picture or a disturbance of a still picture are avoided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. In a first wireless communication device, a method of carrying out wireless communication with a second wireless communication device, said method comprising:

(a) selecting a highest frequency band from a plurality of frequency bands;

(b) determining whether the selected frequency band includes an unused channel in which no disturbing wave is present;

(c) when the selected frequency band includes the unused channel in which no disturbing wave is present, determining, for a highest one of a plurality of transmission rates associated with the selected frequency band, whether a received field strength value exceeds a threshold value, if the received field strength value at the highest transmission rate exceeds the threshold value, initiating communication with the second wireless communication device using the unused channel of the selected frequency band as a communication channel at the highest transmission rate, if the received field strength value at the highest transmission rate does not exceed the threshold value, determining whether an immediately lower one of the plurality of transmission rates exceeds the threshold value, if the received field strength value at the immediately lower transmission rate exceeds the threshold value, initiating communication with the second wireless communication device using the unused channel of the selected frequency band as a communication channel at the immediately lower transmission rate, if the received field strength value at the immediately lower transmission rate does not exceed the threshold value, (i) determining whether the received field strength value at a next lower one of the plurality of transmission rates exceeds the threshold value, (ii) if the received field strength value at the next lower transmission rate exceeds the threshold value, initiating communication with the second wireless communication device using the unused channel of the selected frequency band as a communication channel at the next lower transmission rate, (iii) if the received field strength value at the next lower transmission rate does not exceed the threshold value, repeating steps (i) through (iii) until the received field strength value at the next lower one of the plurality of transmission rates exceeds the threshold value or until the next lower one of the plurality of transmission rates is a lowest acceptable transmission rate, and (iv) if the next lower one of the plurality of transmission rates is the lowest acceptable transmission rate, initiating communication with the second wireless communication device using the unused channel of the selected frequency band as a communication channel at the next lower transmission rate without determining whether the received field strength value at the lowest acceptable transmission rate exceeds the threshold value; and (d) when the selected frequency band (i) does not include an unused channel, or (ii) does not include an unused channel in which no disturbing wave is present, or (iii) includes the unused channel in which no disturbing wave is present but there is no transmission rate associated with the selected frequency band at which the received field strength value exceeds the threshold value, selecting the next highest frequency band from the plurality of frequency bands and repeating steps (b) through (d) using the next highest frequency band as the selected frequency band.

2. A method according to claim 1, wherein when none of the plurality of frequency bands includes an unused channel or when none of the plurality of frequency bands includes an unused channel in which no disturbing wave is present, said method further comprises: setting a predetermined channel of a predetermined frequency band as the communication channel, setting a predetermined transmission rate for the communication channel, and then initiating communication with the second wireless communication device using the communication channel at the predetermined transmission rate.

3. A method according to claim 1, wherein when none of the plurality of frequency bands includes an unused channel or when none of the plurality of frequency bands includes an unused channel in which no disturbing wave is present, said method further comprises: transmitting a message to the second wireless communication device indicating that communication cannot be carried out.

4. A method according to claim 1, wherein said step of determining whether the selected frequency band includes an unused channel in which no disturbing wave is present includes:

determining whether the selected frequency band includes a first unused channel, when the selected frequency band includes the first unused channel, determining whether a disturbing wave is present in the first unused channel, when no disturbing wave is present in the first unused channel, defining the first unused channel as the unused channel in which no disturbing wave is present, and when the disturbing wave is present in the first unused channel, (i) determining whether the selected frequency band includes another unused channel, (ii) when the selected frequency band includes the another unused channel, determining whether a disturbing wave is present in the another unused channel, (iii) when the disturbing wave is present in the another unused channel, repeating steps (i) through (iii) using yet another unused channel in place of the another unused channel, and (iv) when no disturbing wave is present in the another unused channel, defining the another unused channel as the unused channel in which no disturbing wave is present.

5. In a first wireless communication device, a method of carrying out wireless communication with a second wireless communication device, said method comprising:

periodically determining, during communication with the second wireless communication device using a particular channel of a given one of a plurality of frequency bands as a communication channel, whether a disturbing wave is present in the communication channel; and when the disturbing wave is present in the communication channel, (a) determining whether the given one of the plurality of frequency bands includes an unused channel in which no disturbing wave is present, (b) when the given one of the plurality of frequency bands includes the unused channel in which no disturbing wave is present, determining a maximum transmission rate at which a received field strength value exceeds a threshold value from a plurality of transmission rates associated with the given one of the plurality of frequency bands, (c) when the given one of the plurality of frequency bands (i) does not include an unused channel, or (ii) does not include an unused channel in which no disturbing wave is present, or (iii) includes the unused channel in which no disturbing wave is present but none of the associated plurality of transmission rates provides a received field strength value that exceeds the threshold value, substituting another one of the plurality of frequency bands for the given one of the plurality of frequency bands and then repeating steps (a) through (c), (d) when the maximum transmission rate is successfully determined in step (b), continuing communication with the second wireless communication device using the unused channel as the communication channel at the determined maximum transmission rate; and (e) when none of the plurality of frequency bands includes an unused channel or when none of the plurality of frequency bands includes an unused channel in which no disturbing wave is present, continuing communication with the second wireless communication device for a predetermined time period using the given one of the plurality of frequency bands as the communication channel.

6. A method according to claim 5, wherein said step of determining whether the given one of the plurality of frequency bands includes an unused channel in which no disturbing wave is present includes:

determining whether the given one of the plurality of frequency bands includes a first unused channel, when the given one of the plurality of frequency bands includes the first unused channel, determining whether a disturbing wave is present in the first unused channel, when no disturbing wave is present in the first unused channel, defining the first unused channel as the unused channel in which no disturbing wave is present, and when the disturbing wave is present in the first unused channel,
  (i) determining whether the given one of the plurality of frequency bands includes another unused channel,
  (ii) when the given one of the plurality of frequency bands includes the another unused channel, determining whether a disturbing wave is present in the another unused channel,
  (iii) when the disturbing wave is present in the another unused channel, repeating steps (i) through (iii) using yet another unused channel in place of the another unused channel, and
  (iv) when no disturbing wave is present in the another unused channel, defining the another unused channel as the unused channel in which no disturbing wave is present.

7. A method according to claim 5, wherein said step of determining a maximum transmission rate at which a received field strength value exceeds the threshold value includes:

determining whether a received field strength value at a highest one of the plurality of transmission rates transmission rate exceeds the threshold value, when the received field strength value at the highest one of the plurality of transmission rates exceeds the threshold value, designating the highest one of the plurality of transmission rates as the maximum transmission rate; and when the received field strength value at the highest one of the plurality of transmission rates does not exceed the threshold value,
  (i) determining whether the received field strength value at a next lower one of the plurality of transmission rates exceeds the threshold value,
  (ii) when the received field strength value at the next lower one of the plurality of transmission rates exceeds the threshold value, designating the next lower one of the plurality of transmission rates as the maximum transmission rate,
  (iii) when the received field strength value at the next lower one of the plurality of transmission rates does not exceed the threshold value, repeating steps (i) through (iii) until either the received field strength value for at least one of the plurality of transmission rates exceeds the threshold value or the next lower one of the plurality of transmission rates is a lowest acceptable transmission rate, and
  (iv) when the next lower one of the plurality of transmission rates is the lowest acceptable transmission rate, setting that transmission rate as the maximum transmission rate without determining whether the received field strength value at that transmission rate exceeds the threshold value.

8. In a first wireless communication device, a method of carrying out wireless communication with a second wireless communication device, said method comprising:

periodically determining, during communication with the second wireless communication device at a particular one of a plurality of transmission rates associated with a given frequency band, whether the plurality of transmission rates includes at least one transmission rate that is higher than the particular transmission rate;

when the plurality of transmission rates includes the at least one transmission rate higher than the particular transmission rate, determining whether a received field strength value at one of the plurality of transmission rates that is immediately higher than the particular one of a plurality of transmission rates exceeds a threshold value;

when the plurality of transmission rates does not include the at least one transmission rate higher than the particular transmission rate or when the received field strength value at the immediately higher one of the plurality of transmission rates does not exceed the threshold value, continuing the communication with the second wireless communication device at the particular transmission rate; and when the received field strength value at the immediately higher one of the plurality of transmission rates exceeds the threshold value,
  (i) determining whether a next higher one of the plurality of transmission rates exists,
  (ii) when the next higher one of the plurality of transmission rates exists, determining whether the received field strength value at the next higher one of the plurality of transmission rates exceeds the threshold value,
  (iii) when the received field strength value at the next higher one of the plurality of transmission rates does not exceed the threshold value, continuing communication with the second wireless communication device at an immediately lower one of the plurality of transmission rates, and
  (iv) when the received field strength value at the next higher one of the plurality of transmission rates exceeds the threshold value, repeating steps (i) through (iv) until the next higher one of the plurality of transmission rates is a highest one of the plurality of transmission rates.

9. In a first wireless communication device, a method of carrying out wireless communication with a second wireless communication device, said method comprising:
- periodically determining, during communication with the second wireless communication device at a particular one of a plurality of transmission rates associated with a given frequency band, whether a received field strength value at the particular one of the plurality of transmission rates exceeds a threshold value;
- when the received field strength value at the particular one of the plurality of transmission rates exceeds the threshold value, continuing the communication with the second wireless communication device at the particular one of the plurality of transmission rates;
- when the received field strength value at the particular one of the plurality of transmission rates does not exceed the threshold value, determining whether the received field strength value at an immediately lower one of the plurality of transmission rates exceeds the threshold value;
- when the received field strength value at the immediately lower one of the plurality of transmission rates exceeds the threshold value, continuing the communication with the second wireless communication device at the immediately lower one of the plurality of transmission rates; and
- when the received field strength value at the immediately lower one of the plurality of transmission rates does not exceed the threshold value,
  - (i) determining whether the received field strength value at a next lower one of the plurality of transmission rates exceeds the threshold value,
  - (ii) when the received field strength value at the next lower one of the plurality of transmission rates exceeds the threshold value, continuing the communication with the second wireless communication device at the next lower one of the plurality of transmission rates,
  - (iii) when the received field strength value at the next lower one of the plurality of transmission rates does not exceed the threshold value, repeating steps (i) through (iii) until either the received field strength value for at least one of the plurality of transmission rates exceeds the threshold value or until the next lower one of the plurality of transmission rates is a lowest acceptable transmission rate, and
  - (iv) when the next lower one of the plurality of transmission rates is the lowest acceptable transmission rate, setting that transmission rate as the maximum transmission rate without determining whether the received field strength value at that transmission rate exceeds the threshold value.

10. A method according to claim 9, wherein when the received field strength value at the least one of the plurality of transmission rates does not exceed the threshold value, said method further comprises:
- selecting another frequency band,
- determining whether the another frequency band includes an unused channel in which no disturbing wave is present,
- when the another frequency band includes the unused channel in which no disturbing wave is present,
  - determining a maximum transmission rate associated with the another frequency band at which the received field strength value exceeds the threshold value, and
  - continuing communication with the second wireless communication device using the unused channel as the communication channel at the determined maximum transmission rate, and
- when the another frequency band does not include an unused channel or does not include an unused channel in which no disturbing wave is present or when the another frequency band includes the unused channel in which no disturbing wave is present but there is no transmission rate associated with the another frequency band at which the received field strength value exceeds the threshold value, continuing communication with the second wireless communication device using the particular channel of the given frequency band as the communication channel at a lowest transmission rate associated with the given frequency band.

11. A wireless communication apparatus for carrying out wireless communication with another wireless communication apparatus, said apparatus comprising:
- means for selecting a highest frequency band from a plurality of frequency bands;
- means for (a) determining whether the selected frequency band includes an unused channel in which no disturbing wave is present, (b) when the selected frequency band includes the unused channel in which no disturbing wave is present, determining a maximum transmission rate at which a received field strength value exceeds a threshold value from a plurality of transmission rates associated with the selected frequency band, and (c) when the selected frequency band (i) does not include an unused channel, or (ii) does not include an unused channel in which no disturbing wave is present, or (iii) includes the unused channel in which no disturbing wave is present there is no transmission rate associated with the selected frequency band at which the received field strength value exceeds the threshold value, selecting the next highest frequency band from the plurality of frequency bands and repeating (a) through (c) using the next highest frequency band as the selected frequency band; and
- means for, when the maximum transmission rate is successfully determined, initiating communication with the another wireless communication apparatus using the unused channel of the selected frequency band as a communication channel at the determined maximum transmission rate;
- wherein said means for determining a maximum transmission rate at which a received field strength value exceeds the threshold value includes:
  - means for determining whether a received field strength value at a highest one of the plurality of transmission rates transmission rate exceeds the threshold value,
  - means for, when the received field strength value at the highest one of the plurality of transmission rates exceeds the threshold value, designating the highest one of the plurality of transmission rates as the maximum transmission rate, and
  - means for, when the received field strength value at the highest one of the plurality of transmission rates does not exceed the threshold value, (i) determining whether the received field strength value at a next lower one of the plurality of transmission rates exceeds the threshold value, (ii) when the received field strength value at the next lower one of the plurality of transmission rates exceeds the threshold value, designating the next lower one of the plurality of transmission rates as the maximum transmission rate, (iii) when the received field strength value at the next lower one of the plurality of transmission rates does not exceed the threshold value, repeating (i) through (iii) until the received field strength value at one of the plurality of transmission rates exceeds the threshold value or the next lower one of the plurality of transmission rates is a lowest acceptable transmission rate, and (iv) when the next lower one of the plurality of transmission rates is the lowest acceptable transmission rate, setting that transmission rate as the maximum transmission rate without determining whether the received field strength value at that transmission rate exceeds the threshold value.

12. An apparatus according to claim 11, further comprising: means for, when none of the plurality of frequency bands includes an unused channel or when none of the plurality of frequency bands includes an unused channel in which no disturbing wave is present, setting a predetermined channel of a predetermined frequency band as the communication channel, setting a predetermined transmission rate for the communication channel, and then initiating communication with the another wireless communication apparatus using the communication channel at the predetermined transmission rate.

13. An apparatus according to claim 11, further comprising: means for, when none of the plurality of frequency bands includes an unused channel or when none of the plurality of frequency bands includes an unused channel in which no disturbing wave is present, transmitting a message to the another wireless communication apparatus indicating that communication cannot be carried out.

14. An apparatus according to claim 11, wherein said means for determining whether the selected frequency band includes an unused channel in which no disturbing wave is present includes:
    means for determining whether the selected frequency band includes a first unused channel,
    means for, when the selected frequency band includes the first unused channel, determining whether a disturbing wave is present in the first unused channel,
    means for, when no disturbing wave is present in the first unused channel, defining the first unused channel as the unused channel in which no disturbing wave is present, and
    means for, when the disturbing wave is present in the first unused channel, (i) determining whether the selected frequency band includes another unused channel, (ii) when the selected frequency band includes the another unused channel, determining whether a disturbing wave is present in the another unused channel, (iii) when the disturbing wave is present in the another unused channel, repeating (i) through (iii) using yet another unused channel in place of the another unused channel, and (iv) when no disturbing wave is present in the another unused channel, defining the another unused channel as the unused channel in which no disturbing wave is present.

15. A wireless communication apparatus for carrying out wireless communication with another wireless communication apparatus, said apparatus comprising:
    means for periodically determining, during communication with the another wireless communication apparatus using a particular channel of a given one of a plurality of frequency bands as a communication channel, whether a disturbing wave is present in the communication channel; and
    means for, when the disturbing wave is present in the communication channel, (a) determining whether the given one of the plurality of frequency bands includes an unused channel in which no disturbing wave is present, (b) when the given one of the plurality of frequency bands includes the unused channel in which no disturbing wave is present, determining a maximum transmission rate at which a received field strength value exceeds a threshold value from a plurality of transmission rates associated with the given one of the plurality of frequency bands, (c) when the given one of the plurality of frequency bands (i) does not include an unused channel, or (ii) does not include an unused channel in which no disturbing wave is present, or (iii) includes the unused channel in which no disturbing wave is present but none of the associated plurality of transmission rates provides a received field strength value that exceeds the threshold value, substituting another one of the plurality of frequency bands for the given one of the plurality of frequency bands and then repeating (a) through (c), (d) when the maximum transmission rate is successfully determined, continuing communication with the another wireless communication apparatus using the unused channel as the communication channel at the determined maximum transmission rate, and (e) when none of the plurality of frequency bands includes an unused channel or when none of the plurality of frequency bands includes an unused channel in which no disturbing wave is present, continuing communication with the another wireless communication apparatus for a predetermined time period using the given one of the plurality of frequency bands as the communication channel.

16. An apparatus according to claim 15, wherein said means for determining whether the given one of the plurality of frequency bands includes an unused channel in which no disturbing wave is present includes:
    means for determining whether the given one of the plurality of frequency bands includes a first unused channel,
    means for, when the given one of the plurality of frequency bands includes the first unused channel, determining whether a disturbing wave is present in the first unused channel,
    means for, when no disturbing wave is present in the first unused channel, defining the first unused channel as the unused channel in which no disturbing wave is present, and
    means for, when the disturbing wave is present in the first unused channel, (i) determining whether the given one of the plurality of frequency bands includes another unused channel, (ii) when the given one of the plurality of frequency bands includes the another unused channel, determining whether a disturbing wave is present in the another unused channel, (iii) when the disturbing wave is present in the another unused channel, repeating (i) through (iii) using yet another unused channel in place of the another unused channel, and (iv) when no disturbing wave is present in the another unused channel, defining the another unused channel as the unused channel in which no disturbing wave is present.

17. An apparatus according to claim 15, wherein said means for determining a maximum transmission rate at which a received field strength value exceeds the threshold value includes:
    means for determining whether a received field strength value at a highest one of the plurality of transmission rates transmission rate exceeds the threshold value,
    means for, when the received field strength value at the highest one of the plurality of transmission rates exceeds the threshold value, designating the highest one of the plurality of transmission rates as the maximum transmission rate; and means for, when the received field strength value at the highest one of the plurality of transmission rates does not exceed the threshold value, (i) determining whether the received field strength value at a next lower one of the plurality of transmission rates exceeds the threshold value, (ii) when the received field strength value at the next lower one of the plurality of transmission rates exceeds the threshold value, designating the next lower one of the plurality of transmission rates as the maximum transmission rate, (iii) when the received field strength value at the next lower one of the plurality of transmission rates does not exceed the threshold value, repeating (i) through (iii) until either the received field strength value for at least one of the plurality of transmission rates exceeds the threshold value exceeds the threshold value or the next lower one of the plurality of transmission rates is a lowest acceptable transmission rate, and (iv) when the next lower one of the plurality of transmission rates is the lowest acceptable transmission rate, setting that transmission rate as the maximum transmission rate without determining whether the received field strength value at that transmission rate exceeds the threshold value.

18. A wireless communication apparatus for carrying out wireless communication with another wireless communication apparatus, said apparatus comprising:

means for periodically determining, during communication with the another wireless communication apparatus at a particular one of a plurality of transmission rates associated with a given frequency band, whether the plurality of transmission rates includes at least one transmission rate that is higher than the particular transmission rate;

means for, when the plurality of transmission rates includes the at least one transmission rate higher than the particular transmission rate, determining whether a received field strength value at one of the plurality of transmission rates that is immediately higher than the particular one of a plurality of transmission rates exceeds a threshold value;

means for, when the plurality of transmission rates does not include the at least one transmission rate higher than the particular transmission rate or when the received field strength value at the immediately higher one of the plurality of transmission rates does not exceed the threshold value, continuing the communication with the another wireless communication apparatus at the particular transmission rate; and means for, when the received field strength value at the immediately higher one of the plurality of transmission rates exceeds the threshold value, (i) determining whether a next higher one of the plurality of transmission rates exists, (ii) when the received field strength value at the next higher one of the plurality of transmission rates exists, determining whether the received field strength value at the next higher one of the plurality of transmission rates exceeds the threshold value, (iii) when the received field strength value at the next higher one of the plurality of transmission rates does not exceed the threshold value, continuing communication with the another wireless communication apparatus at an immediately lower one of the plurality of transmission rates, and (iv) when the received field strength value at the next higher one of the plurality of transmission rates exceeds the threshold value, repeating (i) through (iv) until the next higher one of the plurality of transmission rates is a highest one of the plurality of transmission rates.

19. A wireless communication apparatus for carrying out wireless communication with another wireless communication apparatus, said apparatus comprising:

means for periodically determining, during communication with the another wireless communication apparatus at a particular one of a plurality of transmission rates associated with a given frequency band, whether a received field strength value at the particular one of the plurality of transmission rates exceeds a threshold value;

means for, when the received field strength value at the particular one of the plurality of transmission rates exceeds the threshold value, continuing the communication with the another wireless communication apparatus at the particular one of the plurality of transmission rates;

means for, when the received field strength value at the particular one of the plurality of transmission rates does not exceed the threshold value, determining whether the received field strength value at an immediately lower one of the plurality of transmission rates exceeds the threshold value;

means for, when the received field strength value at the immediately lower one of the plurality of transmission rates exceeds the threshold value, continuing the communication with the another wireless communication apparatus at the immediately lower one of the plurality of transmission rates; and means for, when the received field strength value at the immediately lower one of the plurality of transmission rates does not exceed the threshold value, (i) determining whether the received field strength value at a next lower one of the plurality of transmission rates exceeds the threshold value, (ii) when the received field strength value at the next lower one of the plurality of transmission rates exceeds the threshold value, continuing the communication with the another wireless communication apparatus at the next lower one of the plurality of transmission rates, (iii) when the received field strength value at the next lower one of the plurality of transmission rates does not exceed the threshold value, repeating (i) through (iii) until either the received field strength value for at least one of the plurality of transmission rates exceeds the threshold value or until the next lower one of the plurality of transmission rates is a lowest acceptable transmission rate, and (iv) when the next lower one of the plurality of transmission rates is the lowest acceptable transmission rate, setting that transmission rate as the maximum transmission rate without determining whether the received field strength value at that transmission rate exceeds the threshold value.

20. An apparatus according to claim 19, further comprising:

means for, when the received field strength value at the least one of the plurality of transmission rates does not exceed the threshold value, selecting another frequency band, determining whether the another frequency band includes an unused channel in which no disturbing wave is present, when the another frequency band includes the unused channel in which no disturbing wave is present, (i) determining a maximum transmission rate associated with the another frequency band at which the received field strength value exceeds the threshold value, and (ii) continuing communication with the another wireless communication apparatus using the unused channel as the communication channel at the determined maximum transmission rate, and when the another frequency band does not include an unused channel or does not include an unused channel in which no disturbing wave is present or when the another frequency band includes the unused channel in which no disturbing wave is present but there is no transmission rate associated with the another frequency band at which the received field strength value exceeds the threshold value, continuing communication with the another wireless communication apparatus using the particular channel of the given frequency band as the communication channel at a lowest transmission rate associated with the given frequency band.

* * * * *